US009672063B2

(12) United States Patent
Morrison

(10) Patent No.: US 9,672,063 B2
(45) Date of Patent: Jun. 6, 2017

(54) SCHEDULING, INTERPRETING AND RASTERISING TASKS IN A MULTI-THREADED RASTER IMAGE PROCESSOR

(71) Applicant: CANON KABUSHIKI KAISHA, Tokyo (JP)

(72) Inventor: Paul William Morrison, Erskine Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 14/548,168

(22) Filed: Nov. 19, 2014

(65) Prior Publication Data
US 2015/0145872 A1 May 28, 2015

(30) Foreign Application Priority Data

Nov. 22, 2013 (AU) .................................. 2013260722

(51) Int. Cl.
G06F 9/46 (2006.01)
G06T 11/40 (2006.01)
G06T 11/60 (2006.01)
G06F 9/50 (2006.01)
G06K 15/02 (2006.01)

(52) U.S. Cl.
CPC .............. G06F 9/46 (2013.01); G06F 9/5027 (2013.01); G06K 15/1823 (2013.01);
(Continued)

(58) Field of Classification Search
CPC .......... G06F 9/46; G06F 3/1237; G06F 3/124; G06F 3/1241; G06F 9/5027;
(Continued)

(56) References Cited

U.S. PATENT DOCUMENTS 5,886,701 A * 3/1999 Chauvin ............... G06T 11/001
345/418
6,327,050 B1 * 12/2001 Motamed ........... G06K 15/1857
358/1.15
(Continued)

OTHER PUBLICATIONS

Sha et al., "Real Time Scheduling Theory: A Historical Perspective", Real-Time Systems, (2004), 28, pp. 101-155, Kluwer Academic Publishers. Manufactured in the Netherlands.

Primary Examiner — Yon Couso
(74) Attorney, Agent, or Firm — Canon USA, Inc. I.P. Division

(57) ABSTRACT

A method of rasterizing a document using a plurality of threads interprets objects of the document by performing interpreting tasks associated with the objects. Objects associated with different pages are interpreted in parallel. A plurality of rasterizing tasks associated with the performed interpreting tasks are established, each performed interpreting task establishing a plurality of rasterizing tasks. The method estimates an amount of parallelisable work available to be performed using the plurality of threads. The amount of parallelisable work is estimated using the established rasterizing tasks and an expected number of interpreting tasks to be performed. The method selects, based on the estimated amount of parallelisable work, one of (i) an interpreting task to interpret objects of the document, and (ii) a rasterizing task from the established plurality of rasterizing tasks, and then executes the selected task using at least one thread to rasterize the document.

16 Claims, 17 Drawing Sheets

(52) U.S. Cl.
CPC .......... *G06K 15/1857* (2013.01); *G06T 11/40* (2013.01); *G06T 11/60* (2013.01); *G06F 2209/5017* (2013.01)

(58) Field of Classification Search
CPC .. G06F 2209/5017; G06T 11/60; G06T 11/40; G06K 15/02; G06K 15/1238; G06K 15/1257; G06K 15/1857; G06K 15/1823; H04L 67/1008; H04N 1/32475
See application file for complete search history.

(56) References Cited

U.S. PATENT DOCUMENTS

| | | |
|---|---|---|
| 8,082,545 B2 | 12/2011 | Prakash |
| 2004/0061892 A1* | 4/2004 | Ferlitsch ............... G06F 3/1211 358/1.15 |
| 2004/0196496 A1* | 10/2004 | Klassen ............... G06F 3/1285 358/1.15 |
| 2009/0161163 A1* | 6/2009 | Klassen ................. G06F 3/124 358/1.18 |
| 2010/0070979 A1 | 3/2010 | Ludwin et al. |
| 2010/0277757 A1* | 11/2010 | Smith ..................... G06F 3/124 358/1.15 |
| 2011/0194125 A1* | 8/2011 | Rivshin .............. G06K 15/1849 358/1.9 |
| 2013/0155456 A1 | 6/2013 | Morrison et al. |
| 2013/0250353 A1* | 9/2013 | Hara .................. G06K 15/1857 358/1.15 |

\* cited by examiner

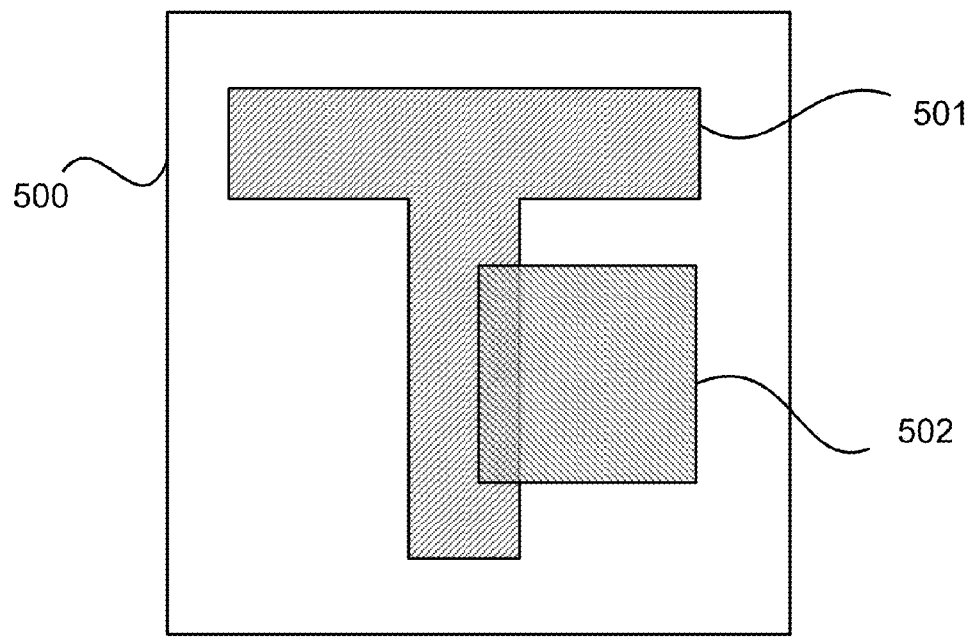
Fig. 5A
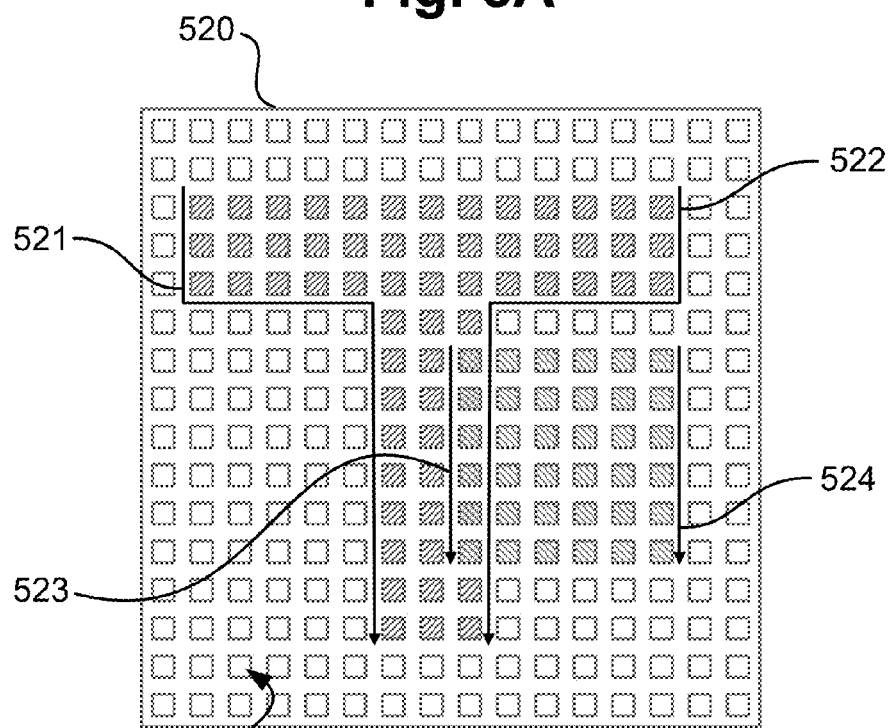
Fig. 5B(1)
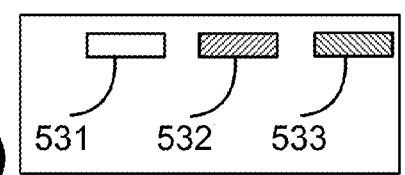
Fig. 5B(2)

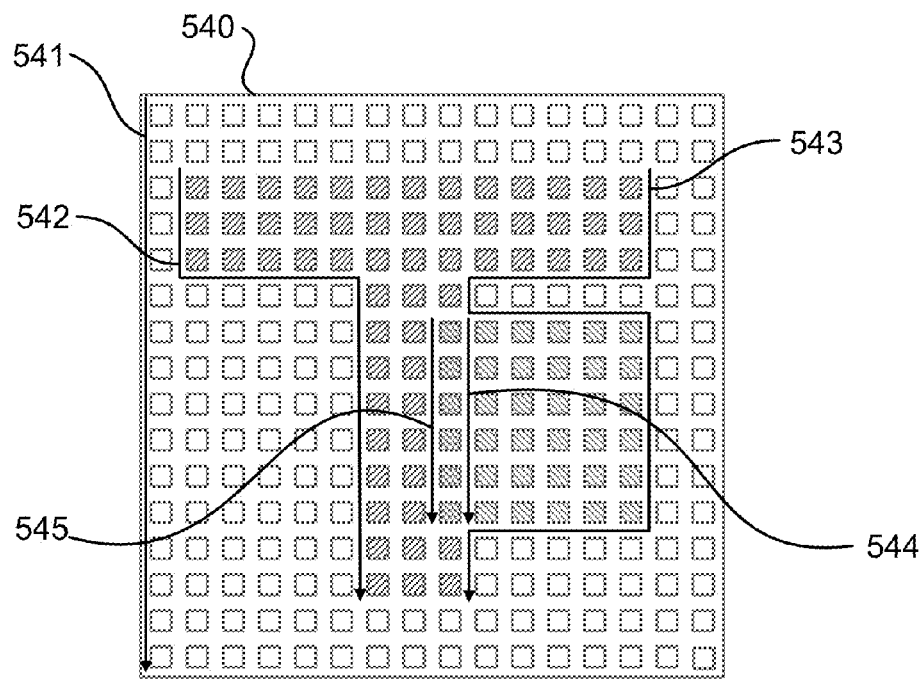
Fig. 5C(1)
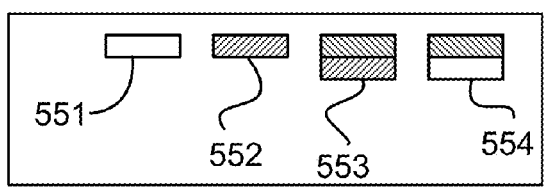
Fig. 5C(2)
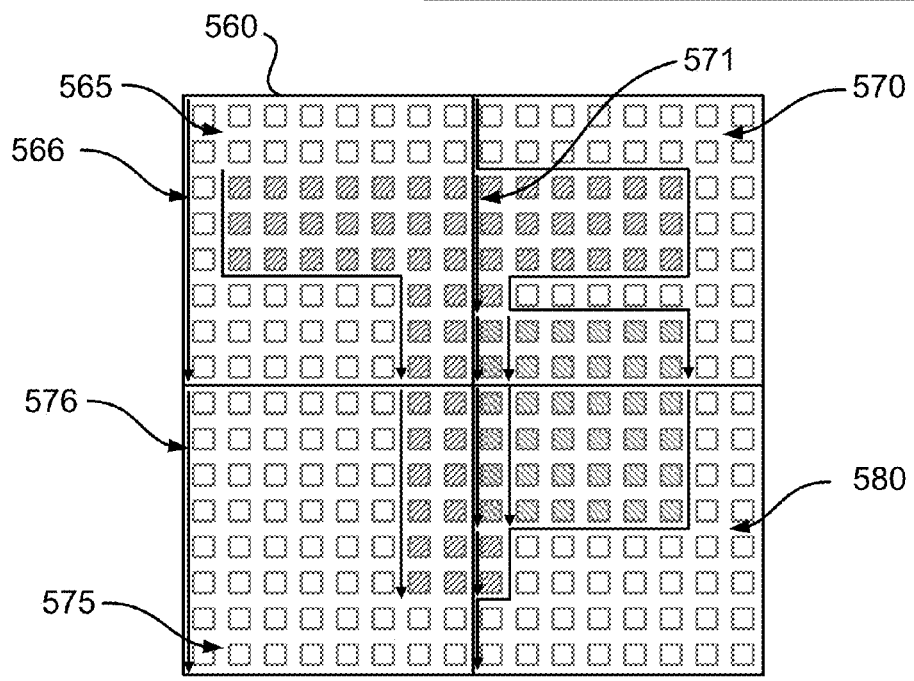
Fig. 5D

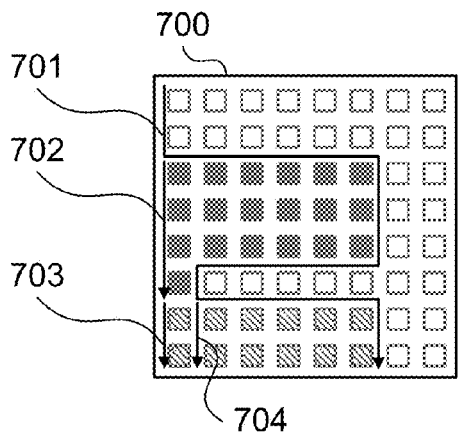
Fig. 7A(1)
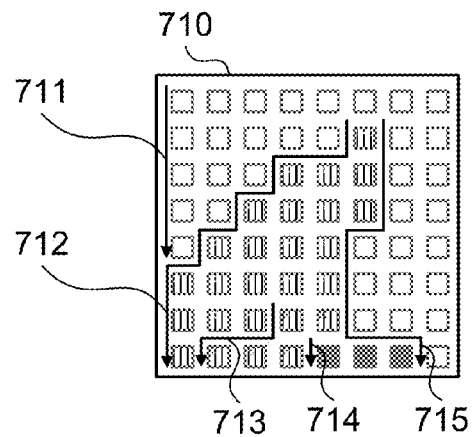
Fig. 7A(2)
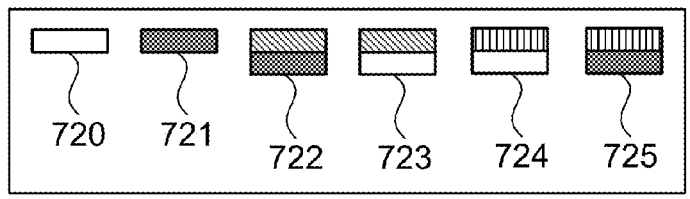
Fig. 7A(3)
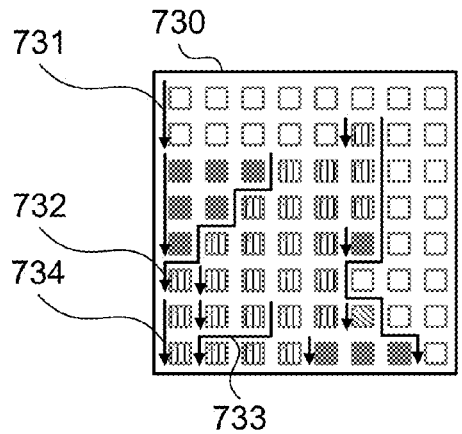
Fig. 7B(1)
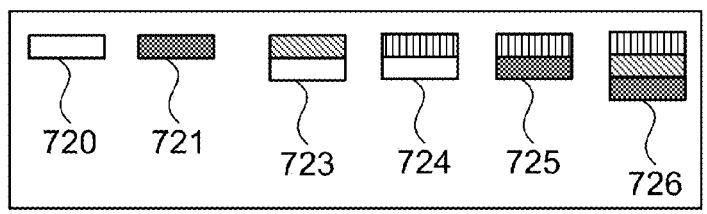
Fig. 7B(2)

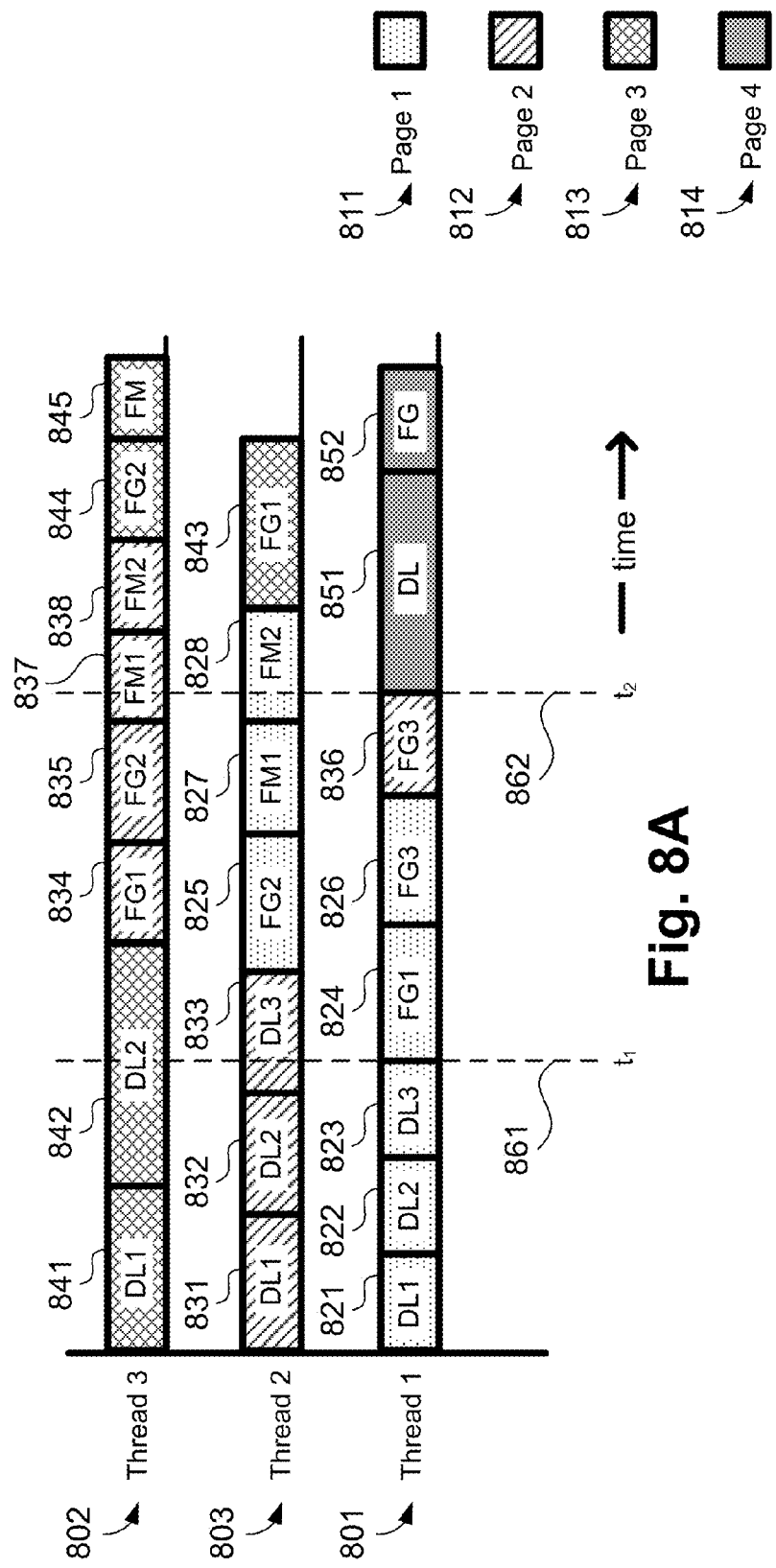

SCHEDULING, INTERPRETING AND RASTERISING TASKS IN A MULTI-THREADED RASTER IMAGE PROCESSOR

REFERENCE TO RELATED PATENT APPLICATION(S)

This application claims the benefit under 35 U.S.C. §119 of the filing date of Australian Patent Application No. 2013260722, filed Nov. 22, 2013, hereby incorporated by reference in its entirety as if fully set forth herein.

TECHNICAL FIELD

The present invention relates generally to the field of graphics rendering and, in particular, to a method, apparatus and system for scheduling tasks in a multi-threaded raster image processor (RIP). The present invention also relates to a computer program product including a computer readable medium having recorded thereon a computer program for scheduling tasks in a multi-threaded RIP.

BACKGROUND

The trend of achieving performance speedup through the use of multi-core and multi-processor architectures in computer systems, including printing systems, has gained widespread use in recent years. Multi-core and multi-processor architectures allow a number of threads belonging to one or more processes to execute in parallel across a number of CPUs, thereby reducing the overall execution time.

In order to take advantage of such parallelism, a process must typically be broken down into "tasks". A task is a well-defined portion of the overall process to be performed on given input data to produce some output data. The tasks of a process should be largely independent and able to be executed in parallel.

The order in which tasks are executed, and the thread used to execute each task, is typically controlled by an application-level scheduler. The scheduler is executed within a multi-threaded process or application, and is typically separate to a scheduler that may be executing within an underlying operating system. When deciding which task to execute next, or with which thread to execute a task, the scheduler must often consider a several factors. For example, in a raster image processor (RIP) in a printing system, it is desirable that:

(i) the total time taken to process all pages being printed is minimised;
(ii) the processors are each well-utilised;
(iii) the time taken to output the first page being printed is minimised;
(iv) all pages are output in a regular and timely fashion; and
(v) the amount of memory used/required is minimised.

Many of these goals are conflicting. For example, minimising the total time taken to process all pages may result in an increase in the amount of memory used. It is difficult to simultaneously achieve all desired goals. Existing methods in the prior art are capable of achieving a subset of these goals, but none can claim to achieve all goals simultaneously, particularly in most, if not in all, situations.

Operating system scheduling has, and continues to be, an important and active research area in the field of computer science. An operating system scheduler must typically deal with several active processes, ensuring that each eventually completes and receives a fair amount of processor time. The main goal of an operating system scheduler is to keep the processors well-utilised while ensuring that high-priority processes are executed quickly. The only process-specific information an operating system scheduler can know is the user-specified priority of each process. The scheduler is not aware of the individual tasks making up a multi-threaded process, and therefore cannot hope to address several of the goals listed above.

Several heuristics have been developed for scheduling parallel tasks in a multi-threaded application. The tasks are typically modelled as a directed acyclic graph (DAG), in which nodes represent tasks and edges represent dependencies between tasks. The duration of each task may be estimated (prior to running the tasks).

Critical path heuristics are commonly used to determine the order in which tasks should be selected to be run. The critical path is the path through the DAG, from the first task to the last, that is the longest execution path. Critical path heuristics always attempt to execute tasks on the critical path before other tasks. List scheduling heuristics also use a DAG to perform task scheduling. However, list scheduling heuristics prioritise tasks by the number of dependencies they have, and always attempt to execute the task that has the largest number of dependencies. The goal of both critical path heuristics and list scheduling heuristics is always to reduce the total time taken to process all tasks. These heuristics don't have the ability to address the other goals listed above.

Another subclass of heuristics, commonly used in web servers, has the goal of executing individual jobs as quickly as possible. For example, first-come first-served and shortest response time heuristics prioritise jobs by their time of arrival and urgency, respectively. If jobs have specified deadlines for when their execution should complete, the earliest deadline first heuristic can be used. This heuristic simply prioritises jobs by their deadline, always giving preference to the job with the earliest deadline. This subclass of heuristics may address some of the above goals, namely a minimal time to output the first page, and regular page output. However, these heuristics are not capable of addressing all goals.

In the related area of supercomputing and grid computing, system-level scheduling is often used to balance resource utilisation and the timely completion of individual jobs. One widely used technique is known as backfill scheduling. The input typically consists of several multi-threaded processes or jobs, whose required number of processors is known. Each job also has a priority, which is typically specified by the user. The scheduler attempts to execute the jobs in order of priority. As a job can only run if the number of processors required by the job are available, the job may be delayed, and another job may be executed in its place. If there are unused processors at any given time, a lower-priority job that requires few processors may be executed. Backfill scheduling may address several of the above listed goals in some situations. However, backfill scheduling assumes that there are enough jobs available with widely-varying processor requirements in order to maintain high processor utilisation. This may not always be the case. Further, backfill scheduling does not consider dependencies between jobs, which can limit the available parallelism at any given point in time.

SUMMARY

According to one aspect of the present disclosure there is provided a method of rasterising a document using a plurality of threads. The method interprets objects of the document by performing interpreting tasks associated with the objects, wherein objects associated with different pages are interpreted in parallel, and establishes a plurality of rasterising tasks associated with the performed interpreting tasks, each performed interpreting task establishing a plurality of rasterising tasks. The method estimates an amount of parallelisable work available to be performed using the plurality of threads, where the amount of parallelisable work being estimated using the established plurality of rasterising tasks and an expected number of interpreting tasks to be performed. Then the method selects, based on the estimated amount of parallelisable work, one of: (i) an interpreting task to interpret objects of the document, and (ii) a rasterising task from the established plurality of rasterising tasks. Lastly the method executes the selected task using at least one thread to rasterize the document.

In a preferred implementation the method comprises selecting and executing the interpreting tasks to increase the amount of parallelisable work.

Desirably the selecting further comprises determining the relative need for (i) increasing the amount of parallelisable work available, and (ii) outputting the next page.

Preferably the estimated number of interpreting tasks is based on a number of pages remaining to be processed for the document and objects of the document yet to be interpreted;

Typically the expected number of interpreting tasks is determined based on complexity of the pages.

The method may comprise favouring the execution of interpreting tasks upon observing a decreasing amount of parallelisable work.

Alternatively the method may comprise favouring the execution of rasterising tasks upon observing an increasing amount of parallelisable work.

In a preferred implementation the parallelisable work comprises the number of rasterising tasks in the established plurality of rasterising tasks together with the expected number of interpreting tasks to be performed for the document, the expected number of interpreting tasks being based on the number of pages left in the document.

In another implementation, the estimating of the amount of parallelisable work further comprises applying a weighting factor to the rasterising tasks and expected interpreting tasks to be performed, wherein different weighting factors are given to interpreting and rasterising tasks based on the estimated relative processing time of interpreting and rasterising tasks.

Preferably the selecting is based on a plurality of thresholds which are dependent on the number of threads and the number of interpreting threads. More specifically, if the amount of parallelisable work is below a first threshold, an interpreting task is selected, and where the amount of parallelisable work is above a second threshold, a rasterising task is selected. Desirably the first and second thresholds are different with the second threshold being no less that the first threshold.

Another implementation further comprises estimating the complexity of pages left in the document from a PDL source using at least one of the number of pages described by the PDL source, a number of objects on a page, and/or a number of z-bands of a page Another comprises estimating the complexity of a current page by considering a complexity of at least one immediately preceding page.

Other aspects are also disclosed.

BRIEF DESCRIPTION OF THE DRAWINGS

At least one embodiment of the invention will now be described with reference to the following drawings, in which:

FIG. 5A shows an exemplary page with graphic objects;

FIGS. 5B(1) and 5B(2) shows the pixel-aligned object edges, and their associated fills, of the page of FIG. 5A;

FIGS. 5C(1) and 5C(2) shows a fillmap representation of the page of FIG. 5A;

FIG. 5D shows a tiled fillmap representation of the page of FIG. 5A;

FIGS. 7A(1), 7A(2), 7A(3), 7B(1) and 7B(2) show collectively the merging of the two fillmap tiles, based on the z-bands shown in FIG. 6B;

FIGS. 8A and 8B show an example of the execution of tasks within the builder module;

DETAILED DESCRIPTION INCLUDING BEST MODE

Methods are described for measuring the amount of parallelisable work available. Methods are also described for using the amount of parallelisable work available to select the next task to run on an idle thread, so as to achieve one of several goals. Such methods are described as implemented in a multi-threaded RIP, and more specifically a builder module that constructs fillmap representations of each page. Such methods can be applied to other multi-threaded applications to achieve similar goals.

Context
(Printing System)

Figure 1:
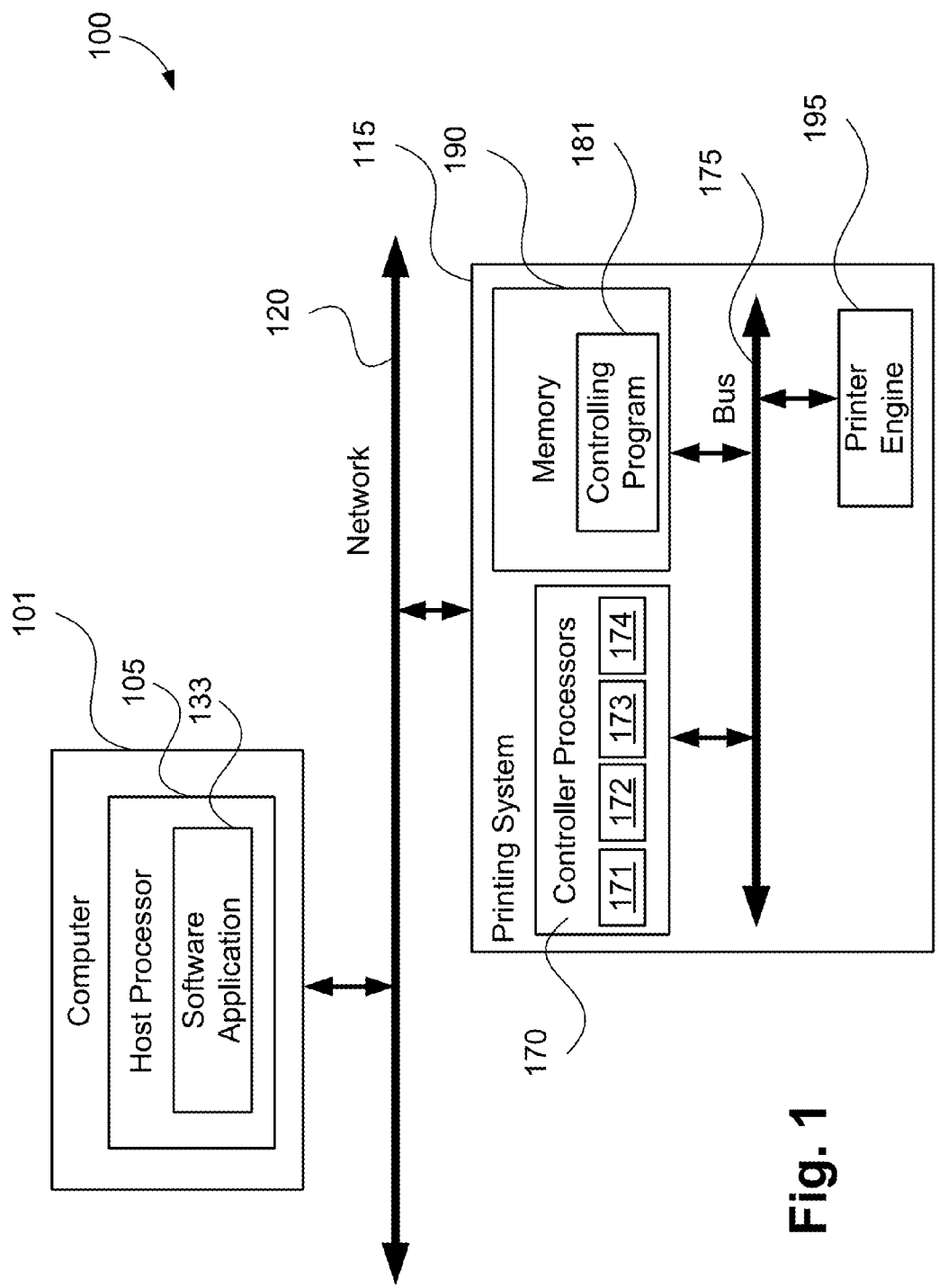
FIG. 1 is a schematic block diagram of a multi-processor printing system for rendering a document according to the present disclosure.

FIG. 1 shows a schematic block diagram of a pixel rendering system 100 for rendering graphic objects. The pixel rendering system 100 includes a computer module 101 connected to a printer system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices via ports, such as a USB, serial, parallel or FireWire port.

The computer module 101 comprises at least one host processor 105 for executing a software application 133, such as a word processor or graphical software application.

The printing system 115 comprises plurality of controller processors 170. As shown in FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of the various kinds of processors described above.

The printing system 115 also has a printer engine 195 coupled to the controller processors 170, via an interconnected bus 175. The controlling program 181 accepts a printable document 201 produced by a software application 133 and produces pixel data values for printing. The pixel data values may then be stored in memory 190 and reproduced as pixels by the printer engine 195, for example. The controlling program 181 may be executed by the controller processors 170 in one or more threads of execution. A thread consists of a number of instructions or steps that are executed in sequence by one of the processors 171-174. The controlling program 140 will be further described in detail below with reference to FIG. 2.

Figure 3A:
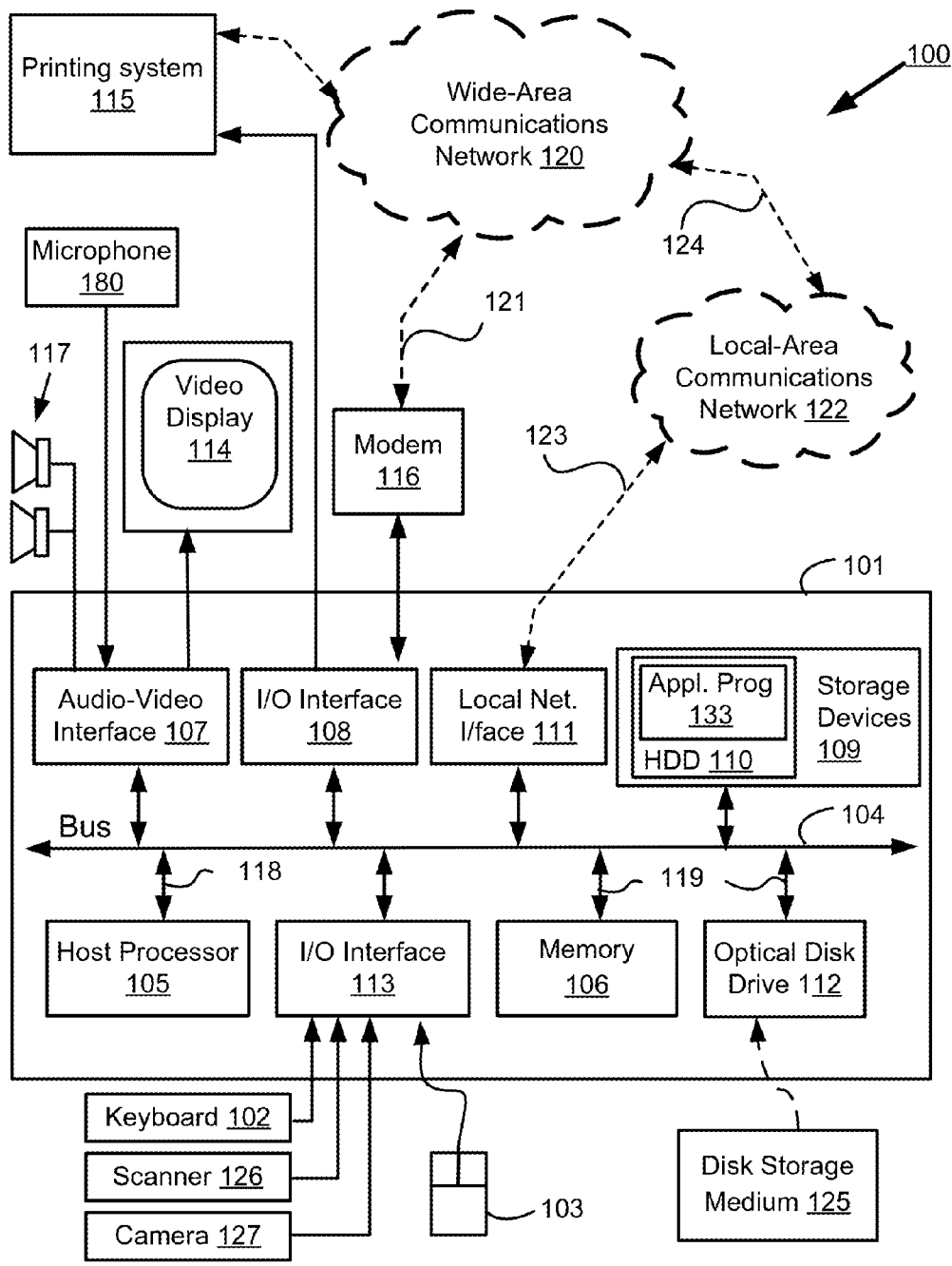
FIGS. 3A and 3B collectively form a schematic block diagram of a general purpose computer system in more detail.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2 and 4 to 15, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2 and 4 to 15 to be described, may be implemented as one or more of the code modules forming the controlling program 181 executable within the printing system 115. Again, one or more of the steps of the described methods may be affected by instructions, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably affects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
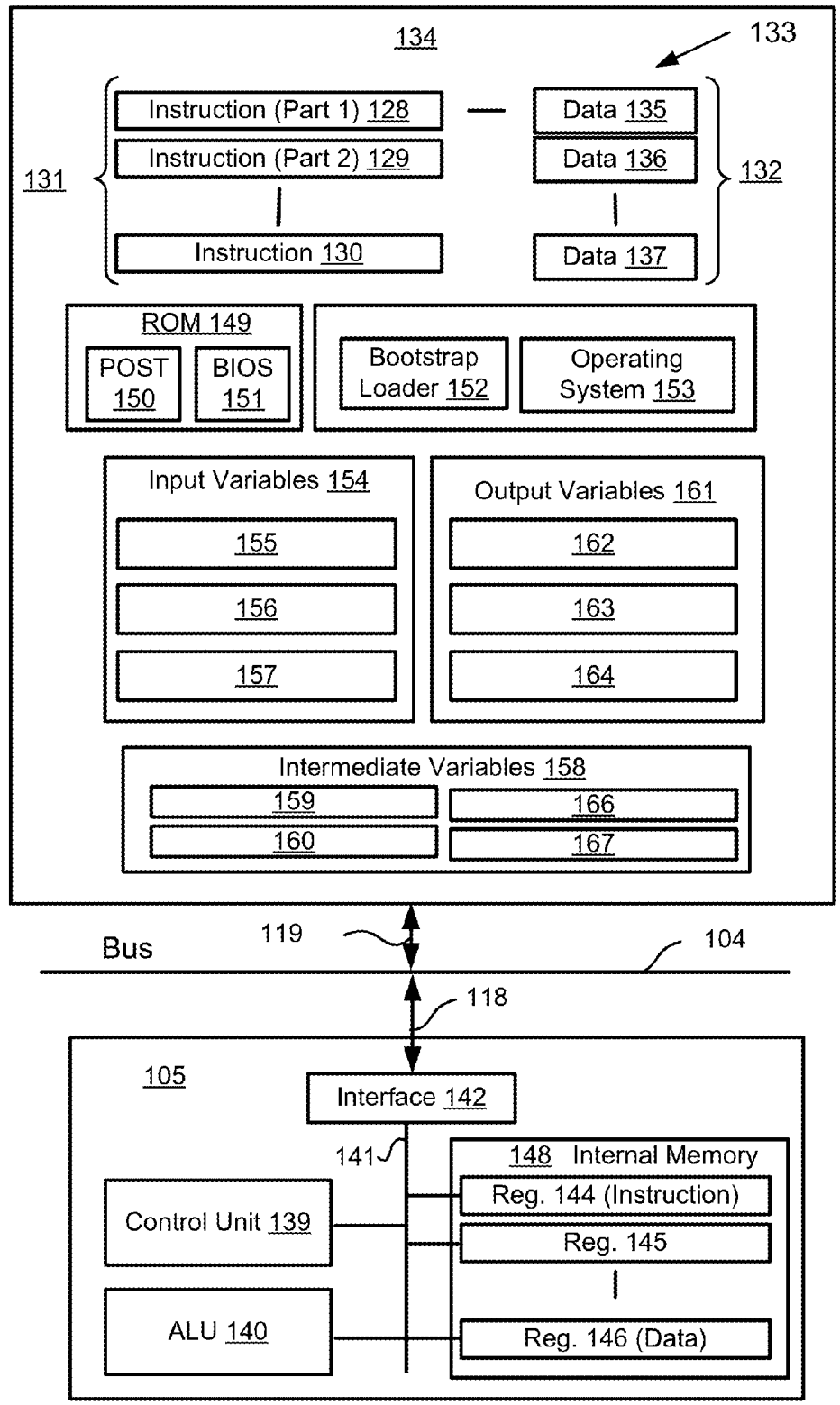

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 15 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 15, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably affects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

(Printing Modules)

Figure 2:
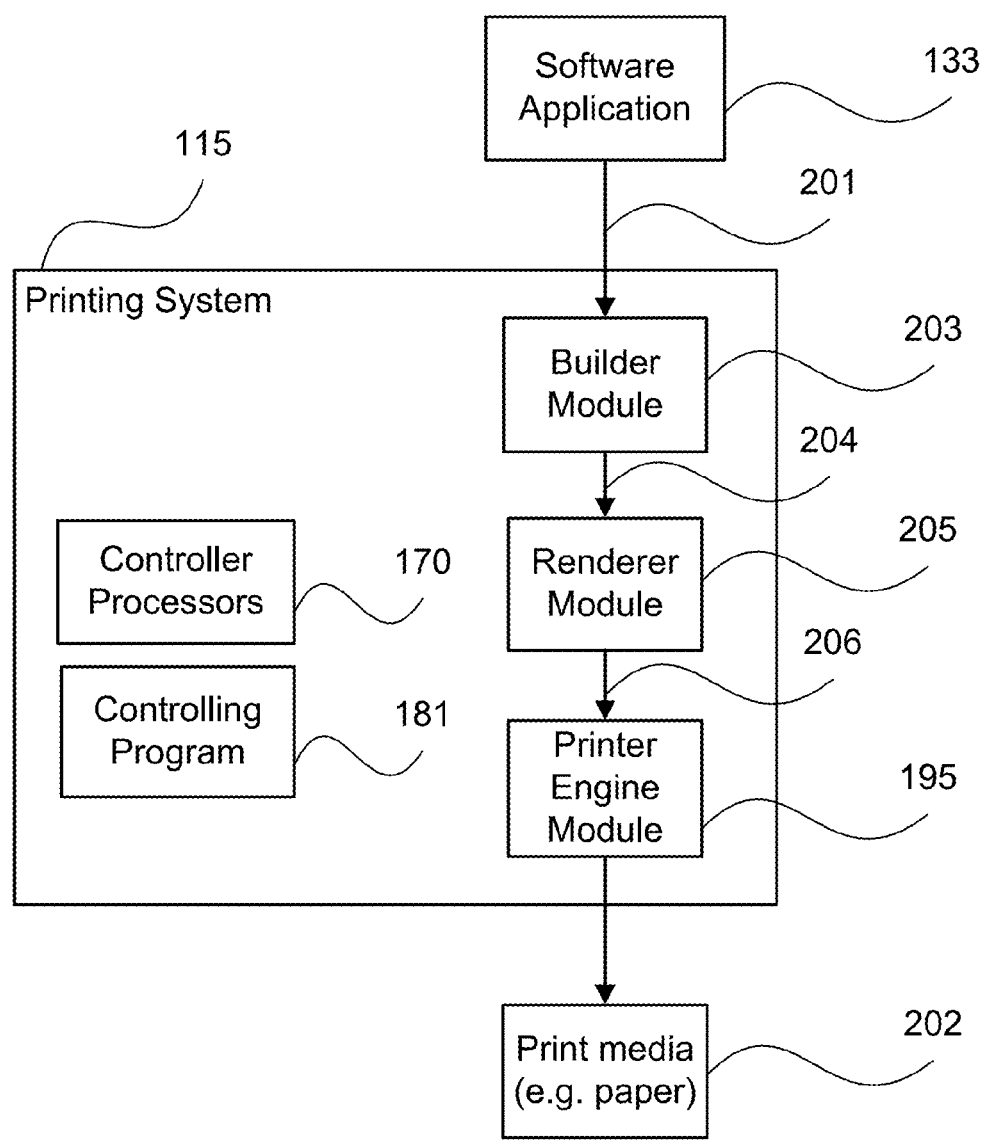
FIG. 2 is a software architecture for the printing system of FIG. 1.

FIG. 2 shows a software architecture for printing a printable document 201 using the printing system 115. Each of the modules 203 and 205 described below may be formed by one or more of the code modules of the controlling program 181.

The software application 133, for example, executing on the computer module 101, provides the printable document 201 to the printing system 115 for printing to a print media 202, such as a paper sheet. The printable document 201 is typically provided in the form of a description of the printable document 201, the description being specified using a Page Description Language (PDL), such as Adobe® PDF or Hewlett-Packard® PCL. The PDL provides descriptions of graphic objects on each page to be rendered onto the print media 202 in a rendering (or z) order, as opposed to a raster image (i.e. a bitmap of pixel values) of each page to be printed.

A builder module 203 receives the printable document 201 and generates intermediate representations known as final fillmaps 204 of the pages of the printable document 201 to be printed. The printing system 115 then uses a renderer module 205 to render the final fillmaps 204 to pixel data values 206. The pixel data values 206 are printed to the print media 202, such as paper, using a printer engine module 195. The printer engine module 195 may, for example, be an electro-photographic engine.

The builder module 203 and renderer module 205 may be implemented as one or more code modules of the controlling program 181 which is executed by the controller processors 170 within the printing system 115. The builder module 203 will be described in more detail later with reference to FIG. 4.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Returning to FIG. 1, in the pixel rendering system 100, the software application 133 creates printable documents for printing, such as printable document 201. The printable document 201 often contains graphic objects such as text, lines, fill regions, and image data. The software application 133 sends a high-level description of the printable document (e.g., a PDL file) via the network 120 to the controlling program 181 that is executed by the controller processors 170 of the printing system 115. The printable document 201 contains all information required by the printing system 115 to render and print each page of the document.

In alternative arrangements, the printing system 115, the controller processors 170 and controlling program 181, may be resident in separate servers connected to the network 120. In still another alternative arrangement, the printing system 115, the controller processors 170 and controlling program 181 may be resident in a distributed network of servers. In such systems, the raster image representation produced by the controlling program 181 is sent to the printer engine module 195 via a network rather than the bus 175.

The described methods may also be implemented as part of other graphics rendering systems in which an intermediate representation is rendered (e.g. for displaying PDF documents on an LCD display). As such, the described methods are not limited to printing systems.

(Builder Tasks)

The builder module 203 will now be described in more detail with reference to FIG. 4. The builder module 203 contains or otherwise implements a preferred implementation of scheduling tasks according to the present disclosure. The purpose of the builder module 203 is to create (build) final fillmaps 204 which are intermediate representations of each page of the printable document 201 being printed.

As described earlier with reference to FIG. 2, the builder module 203 receives a printable document 201 in the form of a PDL. One or more DL (display list) generation tasks (e.g. tasks 401-403) interpret the PDL represented by the printable document 201 in a manner specific to the type of PDL. For example, a PDL in the form of Adobe® PDF will require different interpreting steps to those of a PDL in the form of Hewlett-Packard® PCL. However, no matter the form of PDL, the DL tasks (e.g. tasks 401-403), or interpreting tasks as such are exemplified according to the present description, produce a sequence of graphic objects in an order known in the art as z-order. Typically from the PDL source, the number of pages of the document will be known. In addition, other PDL information can quickly and easily be determined by parsing the objects in each page, such as the number of graphical objects on a page, and/or the number of z-bands used to described the page. In some implementations, the complexity of an immediately preceding page can be used as a guide to the complexity of a current page since generally document complexity is relatively evenly distributed amongst the pages of a document. Even with patent specifications, the complexity distribution between text and drawings whilst substantial, is also distinct and only becomes problematic at the single transition from text (description) to drawings.

Figure 4:
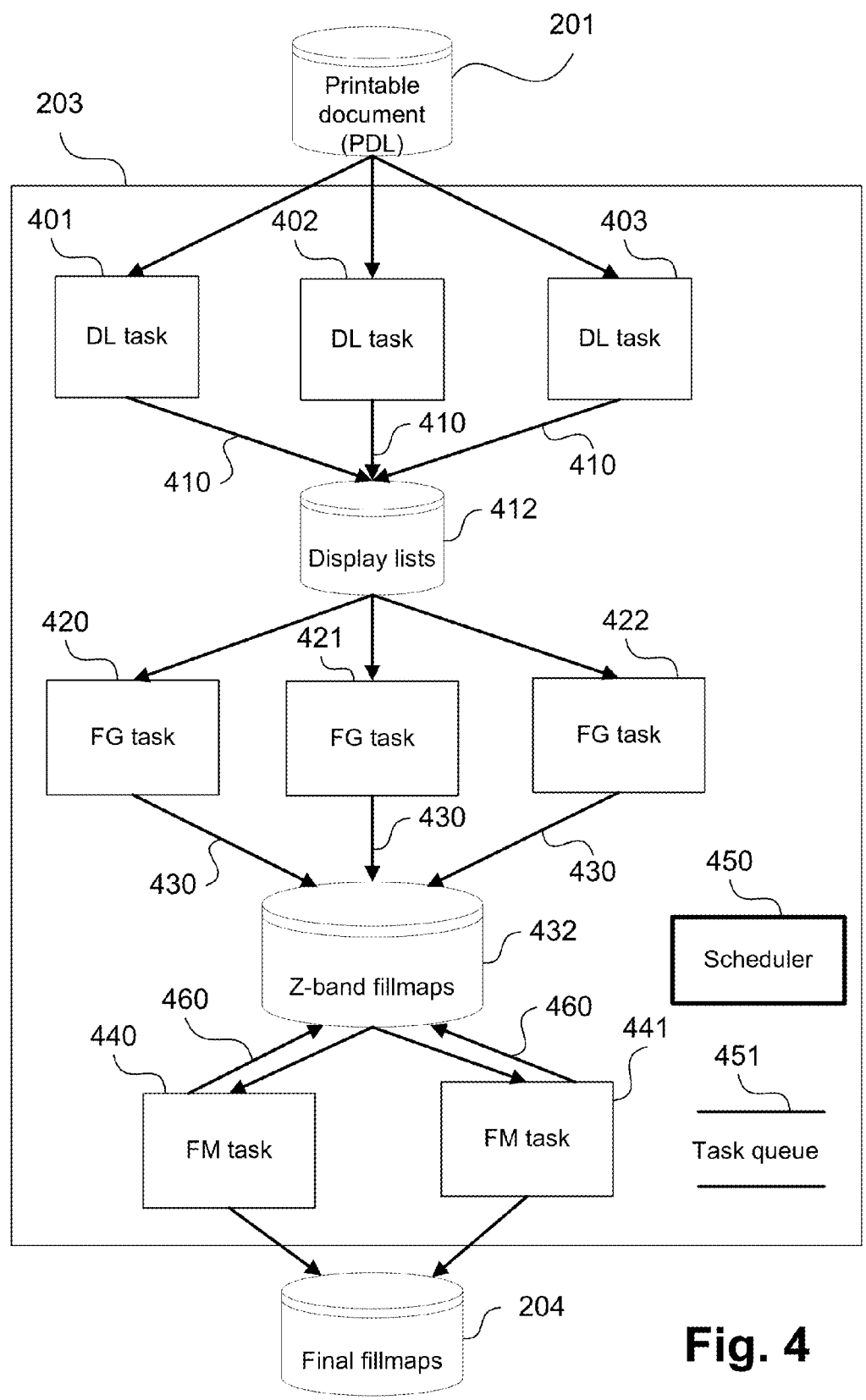
FIG. 4 is a schematic block diagram representation of the tasks and components of the builder module.

Each DL task (e.g. task 401) interprets graphic objects from a page of the printable document 201 in z-order, and produces a z-band display list (e.g. 410), where the display list may be stored to the memory 190, as depicted in FIG. 4 as Display lists 412. Each display list (e.g. 410) contains a sequence of graphic objects with consecutive z-order, sorted by the first scan lines on which the graphic objects appear. An example of splitting the graphic objects of a page of a printable document 201 into one or more z-bands will be described later with reference to FIG. 6.

In some implementations, a DL task may be further split into several interpreting tasks. For example, other interpreting tasks may be executed to compress any image data associated with the graphic objects interpreted by a DL task. Such image compression tasks may be executed in parallel with the DL task, and possibly in parallel with other tasks executed within the builder module 203. However, in some implementations, an image compression task for a particular z-band may need to be completed before a corresponding FG task and rasterising tasks, described below, can begin. Nevertheless, for each page of a document to be printed, there will be at least one interpreting task, and each interpreting task for that page must be executed sequentially. However, objects associated with different pages are interpreted in parallel, using multiple DL (interpreting) tasks that are executed in parallel with controller processors 170.

For each z-band display list (e.g. 410), a corresponding FG (fillmap generation) task (e.g. task 420) is created. In the example shown in FIG. 4, the DL tasks 401-403 have split the graphic objects of a page of the printable document 201 into three z-band display lists 410. Therefore, three FG tasks 420-422 are created. Each FG task (e.g. task 420) receives a display list (e.g. 410) and converts that display list to a z-band fillmap (e.g. 430). The fillmaps (e.g. 430) are temporarily stored in the memory 190 as depicted in FIG. 4 as Z-band Fillmaps 432. For example, FG task 420 receives the z-band display list produced by DL task 401 and produces a z-band fillmap representing the same sequence of graphic objects. The fillmap generation process executed by an FG task (e.g. task 420) will be described in more detail later with reference to FIG. 5.

In some implementations, an FG task may be further split into several FG tasks that can be executed in parallel. For example, the page can be split into several horizontal bands or strips. For a given z-band display list, the z-band fillmap data for each strip can be generated in parallel using several FG tasks, one per strip. This allows z-band fillmaps to be produced more quickly, and increases the parallelism in the builder 203 which will allow controller processors (e.g. 170) with a large number of processors (e.g. 171-174) to be fully utilised.

The z-band fillmaps (e.g. 430) generated by the FG tasks (e.g. tasks 420-422) represent intermediate representations of z-bands of a page of the printable document 201. In order to produce the final fillmap 204 that represents an intermediate representation of an entire page of the printable document 201, one or more FM (fillmap merge) tasks (e.g. tasks 440-441) are required. Each FM task (e.g. tasks 440-441) typically receives two or more z-band fillmaps (e.g. 430) and merges them into a single fillmap, which is another z-band fillmap (e.g. 460). This merged z-band fillmap is then stored back into memory 190, as depicted in FIG. 4 as Z-band Fillmaps 432, in anticipation of additional fillmap merging. If there are no more z-band fillmaps left to merge, the final merge produces the final fillmap 204 of a page of the printable document 201 which, as depicted in FIG. 4, may also be stored to the memory 190.

For example, the FM task 440 merges the z-band fillmaps 430 produced by FG tasks 420 and 421, to produce another z-band fillmap 460. FM task 441 then merges the z-band fillmap 460 produced by FM task 440 with the z-band fillmap produced by FG task 422. As there are only three z-band display lists 410 produced by DL tasks 401-403, in this example, the FM task 441 produces the final fillmap 204 for a page of the printable document 201. The fillmap merge process executed by FM tasks (e.g. tasks 440-441) will be described in more detail later with reference to FIG. 7. As described earlier with reference to FIG. 2, the controlling program 140, and therefore the builder module 203 are executed by a multi-core controller processor 170. The tasks of the builder module 203 (e.g. tasks 401-403, 420-422 and 440-441) are therefore executed in parallel by the processor cores 171-174 of the multi-core controller processor 170. While many of the tasks are able to execute in parallel, there are some dependencies between the tasks that must be satisfied. For example, because a page of the printable document 201 is interpreted in z-order, in one implementation DL tasks for a single page (e.g. tasks 401-403) are executed sequentially. However, DL tasks for different pages can be executed in parallel using different threads. FG tasks are able to execute in parallel with all other tasks, but require a display list to have been produced by a DL task. Similarly, FM tasks are able to execute in parallel with all other tasks, but require two or more z-band fillmaps to have been already produced by FG tasks or other FM tasks, for a given page of the printable document 201.

The present disclosure describes a method of scheduling tasks of a multi-threaded application so as to achieve several goals simultaneously and in a majority of situations. The method is described with reference to the tasks of the builder module 203 described with reference to FIG. 4. To perform this scheduling, the builder module 203 includes a scheduler 450 and a task queue 451. The scheduler 450 performs the operations of creating tasks, adding tasks to the task queue 451, and deciding which task to run on an idle thread, as described in detail later with reference to FIG. 9-15. In the preferred implementation, the scheduler 450 operates in its own thread executing on one of the controller processors 170. The task queue 451 is a queue of tasks whose dependencies have been satisfied, i.e. all required input data have been produced, and therefore are able to be executed. The tasks in the task queue 451 are preferably sorted first by page number (smaller page numbers first), then by z-order (smaller z-orders first). The task queue 451 uses a portion of memory 190 and one of the tasks in the queue 451 is executed as soon as a thread is available. The scheduler 450 and task queue 451 are described in more detail later with reference to FIG. 9-15.

For the purpose of scheduling tasks in the present disclosure, DL tasks are known as interpreting tasks as discussed above, and FG tasks and FM tasks are known as rasterising tasks. By interpreting portions of pages to be printed, interpreting tasks retrieve graphic objects to be processed by the builder module 203. This results in more work to be performed by rasterising tasks, and typically an increase in the amount of memory 190 used by the builder module 203.

Each interpreting task produces work (in the form of a display list) that can be processed by one or more rasterising tasks. For example, the display list produced by a DL task (an interpreting task) will be converted to a z-band fillmap by one or more FG tasks (rasterising tasks), which will then require merging with other z-band fillmaps using one or more FM tasks (also rasterising tasks). Therefore, the act of executing an interpreting task increases the amount of parallelisable work (in the form of rasterising tasks) available in the builder module 203. If several threads become idle, more parallelisable work is beneficial, as it allows the scheduler 450 to allocate tasks to the idle threads so that they may become utilised. Therefore, executing an interpreting task addresses the goals of increasing thread utilisation, and therefore shortening the time taken to process all pages of the printable document 201.

In the preferred implementation, parallel or parallelisable work takes the form of rasterising tasks stored in the task queue 451, DL tasks 401-403 for pages that are still being interpreted, and pages of the printable document 201 (or any other printable documents) waiting to be processed. The pages that are yet to be processed are available to be processed, and so are considered to be available parallelisable work. The number of pages can be readily assessed from the total number of pages supplied with the print job, and knowledge of the number of pages of the print job processed at any point in time.

Each rasterising task processes a portion of a page of the printable document 201, taking the state of the page further towards completion of a final fillmap 204. For example, an FG task produces a z-band fillmap that will be needed for merging. An FM task merges two or more z-band fillmaps to produce either a final fillmap 204 or another z-band fillmap that will be needed for further merging. Therefore, the act of executing a rasterising task leads to a progression of the next page to be output, and therefore shortens the remaining time needed to output the final fillmap 204 for the next page. As a fillmap typically consumes a smaller amount of memory 190 than a display list, executing a rasterising task also addresses the goal of minimising the amount of memory used by the builder module 203.

(Fillmap Description)

A fillmap representation of a graphical image such as a page will now be described in more detail. A fillmap is a region-based representation of a page. The fillmap maps a region of pixels within the page to a fill compositing sequence which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges:

(i) are monotonically increasing in the y-direction of the page;

(ii) do not intersect with each other;

(iii) are aligned with pixel boundaries, meaning that each pixel-aligned fillmap edge consists of a sequence of segments, each of which follows a boundary between two contiguous pixels;

(iv) contain a reference to the fill compositing sequence required to be composited to render to pixels the fillmap region to which the pixel-aligned fillmap edge belongs; and (v) activate pixels within a single fillmap region.

In a preferred implementation, references to fill compositing sequences are indices into a table of fill compositing sequences.

On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill compositing sequence active within each fillmap region of pixels is stored in the table of fill compositing sequences. A fill compositing sequence is a sequence of z-ordered levels, where each level contains attributes such as a fill, the opacity of the level, a compositing operator which determines how to mix the colour data of this level with other overlapping levels, and the priority, or z-order, of the level. A fill specifies the colour or appearance of a single object. A fill may be a flat fill representing a single colour, a blend representing a colour which varies according to a predetermined function such as a linear gradient or sinusoid, a bitmap image, or a tiled (i.e. repeated) image. A fill compositing sequence contains references to all the levels which contribute colour to the pixels within a fillmap region. The table of fill compositing sequences contains all of the fill compositing sequences required to render the page to pixels. The table of fill compositing sequences does not contain duplicate instances of identical fill compositing sequences. Hence, multiple fillmap regions within a fillmap which map to the same fill compositing sequence map to the same instance of the fill compositing sequence within the table of fill compositing sequences.

The generation of a fillmap representation of a page will now be described with reference to FIG. 5A to FIG. 5D. FIG. 5A shows a page representation 500. The page 500 has a white background and two graphic objects 501 and 502 over the background. The first graphic object 501 is an opaque "T" shaped object with a right-leaning hatched fill. The second graphic object 502 is a partially transparent (translucent) square with a left-leaning hatched fill. The second graphic object 502 partially overlaps the first graphic object 501.

FIG. 5B(1) shows the decomposition of the graphic objects 501 and 502 of the page 500 into pixel-aligned graphic object edges, levels and fills according to a pixel grid 520, with FIG. 5B(2) showing a legend of corresponding levels. A graphic object is decomposed into two or more pixel-aligned object edges, a single level, and one or more fills. Pixel-aligned graphic object edges define the activation or deactivation of a level during rasterisation. Pixel-aligned graphic object edges therefore refer to the level of the object from which they are derived. The first graphic object 501 is decomposed into two pixel-aligned graphic object edges 521 and 522, and a level 532 that consists of a right-leaning hatched fill. Pixel-aligned graphic object edges 521 and 522 refer to the level 532 of the first graphic object 501. The second graphic object 502 is decomposed into two pixel-aligned graphic object edges 523 and 524, and a level 533 that consists of a transparent left-leaning hatched fill. Pixel-aligned graphic object edges 523 and 524 refer to the level 533 of the second graphic object 502. The background 525 has a level 531 that consists of white fill.

FIG. 5C(1) shows a fillmap representation 540 of the page 500 represented in FIG. 5A, with a legend of corresponding fill compositing sequences being shown in FIG. 5C(2). The fillmap representation 540 is composed of five pixel-aligned fillmap edges, hereafter known simply as edges or fillmap edges. Each edge references a fill compositing sequence which will be used to determine the colour of each of the pixels activated by that edge. On any given scan line on which an edge is active, the edge will activate those pixels which are immediately to the right of the edge, until the next edge or a page boundary is encountered. The first edge 541 traces the left hand boundary of the page, and references a fill compositing sequence 551 which contains a single opaque level which is to be filled using the background fill. The second edge 542 traces the left hand boundary of the first graphic object 501, and references a fill compositing sequence 552 that contains a single level which is opaque and is to be filled using a right-leaning hatched fill. The third edge 543 references the same fill compositing sequence 551 as the first edge 541. The fourth edge 544 traces the left hand boundary of the region where the second object 502 overlaps the white background. The fourth edge 544 references a fill compositing sequence 554 which contains two levels. The top most level is transparent and is to be filled using a left-leaning hatched fill. The bottom most level is opaque and is to be filled using the background fill. The fifth edge 545 traces the left hand boundary of the region where the second graphic object 502 overlaps the first graphic object 501. The fifth edge 545 references a fill compositing sequence 553 which contains two levels. The top most level is transparent and is to be filled using a left-leaning hatched fill. The bottom most level is opaque and is to be filled using a right-leaning hatched fill.

Accompanying the fillmap representation 540 (430) of the page is a table of fill compositing sequences equivalent to that shown in FIG. 5C(2) which contains the fill compositing sequences 551, 552, 553 and 554 referenced by the edges contained in the fillmap representation 540 of the page.

FIG. 5D shows a tiled fillmap representation 560 of the page represented in FIG. 5A. The tiled fillmap contains four tiles 565, 570, 575 and 580. Each tile has a height and width of eight pixels. In order to generate the tiled fillmap representation 560 of the page, the edges of the original fillmap representation 540 have been split across fillmap tile boundaries. For example, the edge 541 which traces the left hand boundary of the page in the untiled fillmap representation 540 shown in FIG. 5C has been divided into two edges 566 and 576. The first edge 566 activates pixels in the top-left hand tile 565, while the second edge 576 activates pixels in the bottom-left hand tile 575. Also, new edges have been inserted on the tile boundaries to activate the left most pixels of each tile which were previously activated by an edge in a tile to the left of the tile in which the pixels reside. For example, in the top-right tile 570 a new edge 571 has been inserted to activate pixels which were activated by the edge 542 which traces the left hand boundary of the first graphic object 501 in the original fillmap representation 540 shown in FIG. 5C.

(Z-Band Fillmaps)

Figure 6A:
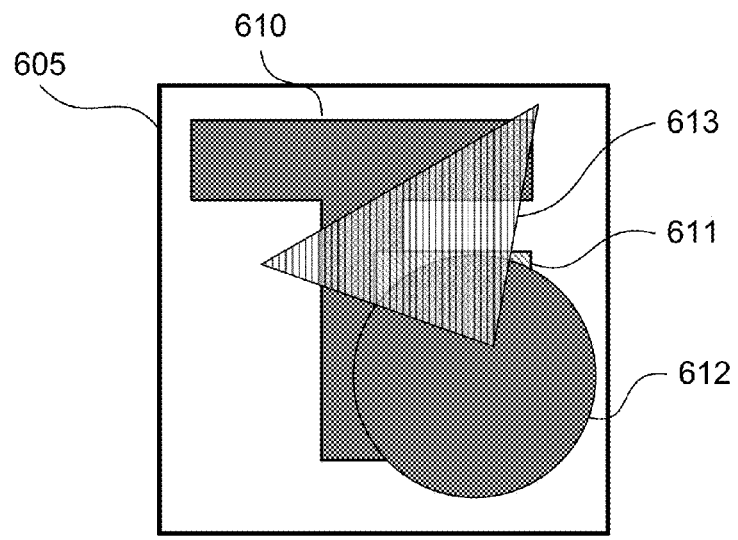
FIGS. 6A and 6B show collectively the splitting of a page of graphic objects into two z-bands.
Figure 6B:
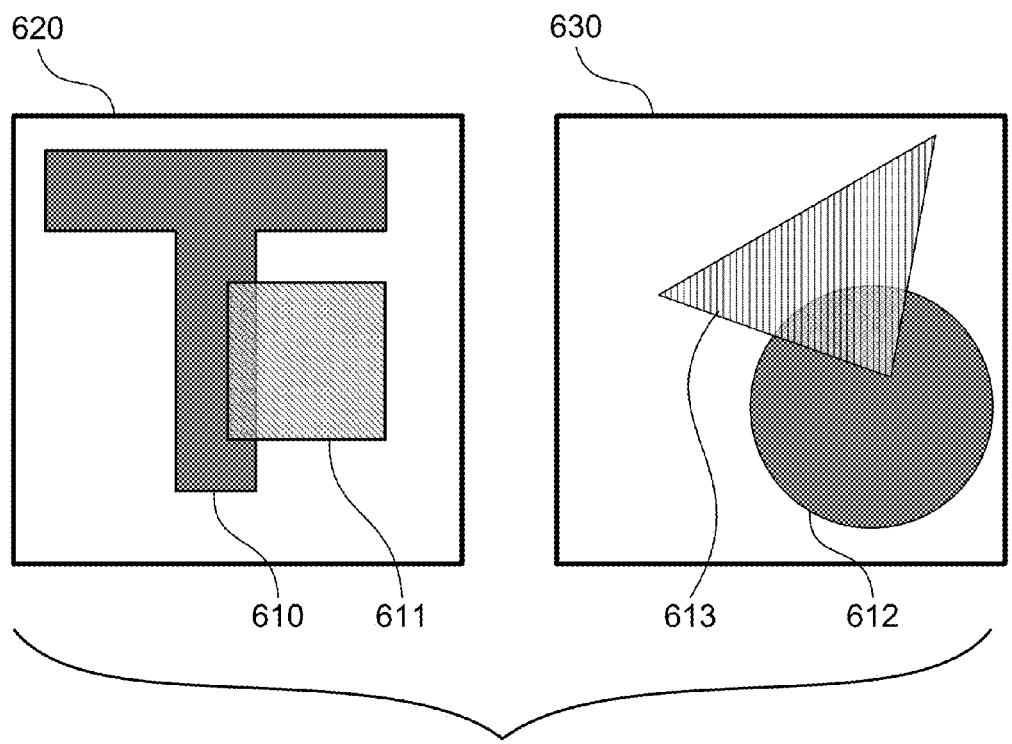

In order to simplify fillmap generation, and to allow fillmap generation to execute in parallel on a multi-core processor, fillmap generation can be split into a number of independent FG tasks. In one implementation, each FG task processes a z-band display list of graphic objects to produce a z-band fillmap. Groups of graphic objects with consecutive z orders are called z-bands. Each z-band is processed as one fillmap. The size of a z-band can be pre-set to some number of graphic objects, or determined during execution according to some criteria such as the complexity of an FG task needed to convert the graphic objects in the z-band to a fillmap. As described previously with reference to FIG. 4, in some implementations a z-band fillmap is produced by multiple FG tasks, each producing a strip of fillmap data potentially in parallel. Referring now to FIGS. 6A and 6B, the process of splitting a page of graphic objects into z-bands will now be described.

FIG. 6A shows a page 605 with four graphic objects, 610-613. Graphic object 610 has the smallest z-order, followed by graphic object 611 which has the next highest z-order, followed by graphic object 612, followed by graphic object 613 which has the highest z-order of all graphic objects 610-613. Graphic objects 610-613 of the page 605 are split into two z-bands 620 and 630 as shown in FIG. 6B. Z-band 620 contains the two graphic objects with smallest z-orders, being graphic object 610 and graphic object 611. Z-band 630 contains the two graphic objects with largest z-orders, being graphic object 612 and graphic object 613. As described previously with reference to FIG. 4, in one implementation these two z-bands are processed by two FG tasks either sequentially or in parallel, to produce two z-band fillmaps. These z-band fillmaps are then merged (by an FM task) to produce a final fillmap for the page 605. In general, the number of fillmaps for a page varies depending on the page being rendered. The advantage of splitting a page of graphic objects into z-bands is that they are processed by multiple FG tasks that are able to be executed in parallel. In this way, a RIP takes advantage of multi-processor and multi-core systems, thereby speeding up the RIP process.

(Fillmap Merging Description)

An example of fillmap merging, as executed by an FM task, will now be described with reference to FIGS. 7A(1) to 7B(2). Consider the two z-bands 620 and 630 as described previously with reference to FIG. 6. The upper-right fillmap tiles 700 and 710 of z-bands 620 and 630, respectively, are shown in FIGS. 7A(1) and 7A(2), with corresponding fill compositing sequences in FIG. 7A(3). These fillmap tiles are produced by the fillmap generation process as described previously with reference to FIGS. 5A to 5D. As fillmap tiles 700 and 710 are part of different z-band fillmaps 620 and 630, respectively, they are generated by different FG tasks.

For fillmap tile 700 of z-band 620, fillmap edge 701 activates fill compositing sequence 720, which consists of the background fill only. Fillmap edge 702 activates fill compositing sequence 721, which consists of an opaque grey fill. Fillmap edge 703 activates fill compositing sequence 722, which consists of a transparent diagonally hatched fill and an opaque grey fill. Fillmap edge 704 activates fill compositing sequence 723, which consists of a transparent diagonally hatched fill and a background fill.

Similarly for fillmap tile 710 of z-band 630, fillmap edge 711 activates fill compositing sequence 720, which consists of the background fill only. Fillmap edge 712 activates fill compositing sequence 724, which consists of a transparent vertically hatched fill and a background fill. Fillmap edge 713 activates fill compositing sequence 725, which consists of a transparent vertically hatched fill and an opaque grey fill. Fillmap edge 714 activates fill compositing sequence 721, which consists of an opaque grey fill. Fillmap edge 715 activates fill compositing sequence 720, which consists of the background fill only. Note that, while the fillmap edges of z-bands 620 and 630 are entirely separate, z-bands 620 and 630 share some fill compositing sequences. For example, fill compositing sequences 720 and 721 are referenced by fillmap edges in both fillmap tile 700 and fillmap tile 710.

Once the fillmaps for z-bands 620 and 630 have been generated (by two FG tasks), they are merged by a FM task to produce a final fillmap for the page 605. The process of merging two or more z-band fillmaps is similar to the process of fillmap generation. That is, the edges activating spans of identical fill compositing sequences on consecutive scan lines are joined such that fillmap edges in the resulting fillmap activate regions of identical fill compositing sequences. The fillmap edges of the z-band fillmaps being merged either remain the same in the final fillmap, are split, joined, extended or deleted according the regions in the merged fillmap. In addition, new edges may be created in the final fillmap that did not exist in any of the z-band fillmaps being merged. In the preferred implementation, z-band fillmaps are merged tile-by-tile.

The result of merging the fillmap tiles 700 and 710 is fillmap tile 730, shown in FIG. 7B(1) together with the fill compositing sequences of FIG. 7B(2). Because fillmap tile 710 represents graphic objects 612 and 613 with the largest z-order, fillmap edges from tile 710 are treated as having a larger z-order than fillmap edges from fillmap tile 700 during the fillmap merge process. Fillmap edge 731 activates fill compositing sequence 720, which consists of the background fill only. Fillmap edges 732 and 733 activate fill compositing sequence 725, which consists of a transparent vertically hatched fill and an opaque grey fill. Fillmap edge 734 activates new fill compositing sequence 726, which consists of a transparent vertically hatched fill, a transparent diagonally hatched fill and an opaque grey fill. Note that fill compositing sequence 722 that was referenced by fillmap edge 703 in z-band fillmap tile 700 is not referenced by any fillmap edge in the merged fillmap 730. The pixels in this region are to be rendered using the new fill compositing sequence 726, which contains the vertically hatched fill that did not appear in z-band 620. Other fillmap edges in the merged fillmap tile 730 reference fill compositing sequences in a similar way.

The final fillmap produced by an FM task represents all graphic objects on the page. This fillmap is equivalent to a fillmap produced by a single FG task for all graphic objects on the page (that is, if no z-banding were done).

Example Task Execution

FIG. 8A shows an example of the execution of the tasks of the builder module 203 in a multi-threaded system in accordance with the scheduler 450 of the present disclosure. In this example, the builder module 203 is processing a printable document 201 consisting of four pages 811-814 seen in FIG. 8B using three threads 801-803. In the preferred implementation, each thread is assigned to execute on a unique controller processor 170 (such assignment is known in the art as "thread affinity"). Therefore, for example, controller processors 171, 172 and 173 may be used to execute the operations of threads 801, 802 and 803, respectively. An additional thread, for example allocated to controller processor 174, is preferably used to perform operations of the scheduler 450 as described in the present disclosure.

Referring to FIG. 8A, the first page 811 is split into three z-bands. The first z-band of the first page 811 is processed using task DL1 821 and task FG1 824. The second z-band of the first page 811 is processed using task DL2 822 and task FG2 825. The third z-band of the first page 811 is processed using task DL3 823 and task FG3 826. The z-band fillmaps produced by tasks FG1 824 and FG2 825 are merged by task FM1 827 to produce a fillmap representation of the first two z-bands of first page 811. The z-band fillmaps produced by tasks FG3 826 and FM1 827 are merged by task FM2 828 to produce the final fillmap for the first page 811.

The second page 812 is also split into three z-bands. The first z-band of the second page 812 is processed using task DL1 831 and task FG1 834. The second z-band of the second page 812 is processed using task DL2 832 and task FG2 835. The third z-band of the second page 812 is processed using task DL3 833 and task FG3 836. The z-band fillmaps produced by tasks FG1 834 and FG2 835 are merged by task FM1 837 to produce a fillmap representation of the first two z-bands of second page 812. The z-band fillmaps produced by tasks FG3 836 and FM1 837 are merged by task FM2 838 to produce the final fillmap for the second page 812.

The third page 813 is split into two z-bands. The first z-band of the third page 813 is processed using task DL1 841 and task FG1 843. The second z-band of the third page 813 is processed using task DL2 842 and task FG2 844. The z-band fillmaps produced by tasks FG1 843 and FG2 844 are merged by task FM 845 to produce the final fillmap for the third page 813.

The fourth page 814 is not split into z-bands, as it contains fewer and/or simpler graphic objects than the first, second and third pages. Page 814 is therefore processed using a single DL task and a single FG task. As only one FG task is required, no FM task is required. The single display list of the fourth page 814 is processed using task DL 851. This display list is converted to the final fillmap for the fourth page 814 using task FG 852.

As described previously with reference to FIG. 4, each FG task 824, 825, 826, 834, 835, 836, 843, 844 and 852 may be further split into multiple FG tasks, each FG task producing a z-band fillmap or final fillmap for a single strip.

Dependencies between tasks are illustrated by the example shown in FIG. 8A. For example, the task FG1 824 corresponding to the first z-band of the first page 811 cannot begin until the task DL1 821 for this z-band is complete. This is because the task FG1 824 takes as input the display list produced by task DL1 821. Similarly, the task FM1 827 for the first page 811 cannot begin until both tasks FG1 824 and FG2 825 are completed. This is because the task FM1 827 takes as input the z-band fillmaps produced by the tasks FG1 824 and FG2 825. Once the final task for a page (either an FG task or an FM task) is complete, the final fillmap for the page is passed to renderer module 205.

Tasks for different pages are always able to be processed in parallel, as there are no dependencies between these tasks. Provided that there are enough system resources, the DL, FG and FM tasks for different pages are able to be executed at the same time. For example, the first z-bands of objects associated with the first, second and third pages 811, 812 and 813 are interpreted in parallel using DL tasks 821, 831 and 841, respectively, which are executed in parallel. The final fillmaps 204 of these pages could even be produced out of order.

Overview

The presently disclosed arrangements address the problem of scheduling tasks in a multi-threaded application so as to achieve several goals simultaneously and in most, if not all situations. In the preferred implementation within a builder module 203 of a printing system 115, achieving the following goals is desired:

(i) the total time taken to process all pages being printed is minimised;

(ii) processors are well-utilised;

(iii) the time taken to output the first page being printed is minimised;

(iv) pages are output in a regular and timely fashion; and (v) the amount of memory used/required is minimised.

Tasks are grouped into interpreting tasks and rasterising tasks. When a thread finishes a task and becomes idle, the scheduler 450 selects either an interpreting task or a rasterising task based on the amount of parallelisable work.

It is desirable that a sufficient amount of parallelisable work be maintained so that threads may be utilised when they become idle. At least one threshold may be used to assess the amount of parallelisable work. When the amount of parallelisable work is below a first, interpreting threshold, the scheduler 450 attempts to select an interpreting task so as to increase the amount of parallelisable work. This addresses the goals of keeping processors well-utilised and minimising the total time taken to process all pages being printed. Situations in which the amount of parallelisable work will be below an interpreting threshold include when the printing system 115 is first switched on, and when a large number of rasterising tasks have recently been completed, since executing rasterising tasks has the effect of reducing the amount of parallelisable work. An example of selecting an interpreting task to increase the amount of parallelisable work will be described later with reference to FIGS. 15A and 15B.

When the amount of parallelisable work is above a second, rasterising (non-interpreting) threshold, the scheduler 450 attempts to select a rasterising task, so as to progress the completion of the next page to be output. This addresses the goals of minimising the time taken to output the first page, outputting pages in a regular and timely fashion, and minimising the amount of memory used. An example of selecting a rasterising task to progress the completion of the next page to be output will be described later with reference to FIGS. 14A and 14B.

When the amount of parallelisable work is between the interpreting threshold and the rasterising threshold (meaning there is no strong preference for which type of task to execute next), it is advantageous that the scheduler 450 attempts to select the type of task that results in improved processing efficiency. For example, if an idle thread most recently completed an interpreting task for a particular page, selecting the next interpreting task for the same page will result in the use of state information held in the cache memory of the associated controller processor 170 without the need to retrieve the information from memory 190 (known in the art as a "cache miss"). Conversely, the information required by a rasterising task for a different page it not likely to be held in the cache memory, so it must be retrieved from memory 190, incurring additional processing time.

Selecting a task based on the amount of parallelisable work (number of parallelisable tasks) offers some important advantages in comparison with selecting a task based on an estimate of memory usage. It is desired to maintain a sufficient amount of parallelisable work so that threads can be utilised should they become idle. An estimate of memory usage provides a coarse view of the total amount of work existing in the application. However, the ability to process that work in parallel is dictated by the division of that work into display lists and z-band fillmaps, and more complex factors such as the state of each page and dependencies between parallel tasks. Further, pages and their graphic objects can vary widely in complexity, causing a large variation in memory used by display lists and z-band fillmaps. This means that an estimate of memory usage cannot provide an accurate view of the division of work into parallelisable portions. Conversely, the estimation of the amount of parallelisable work as performed by the presently disclosed methods provide an accurate view of the tasks that can be executed should a thread become idle.

The interpreting threshold and rasterising threshold may be determined in many ways, including based on the number of threads, and the importance of producing regular output (e.g. if pages are printed in real-time, or buffered prior to printing). For example, it may be beneficial to set an interpreting threshold that is equal to the total number of threads available to execute tasks in the builder module 203. The scheduler 450 will attempt to maintain a number of parallelisable tasks waiting to be executed that is equal to the interpreting threshold. Therefore, if the interpreting threshold is equal to the number of threads available to execute tasks, the scheduler 450 will in effect be attempting to ensure that at least one task is always available for each thread to process if the thread becomes idle. Setting the interpreting threshold in such a way (based on the number of available threads) will therefore address the goal of keeping processors well-utilised and therefore also the goal of minimising the total time taken to process all pages being printed.

The rasterising threshold dictates when (at what amount of parallelisable work) the scheduler 450 attempts to execute rasterising tasks in preference to interpreting tasks. A relatively low rasterising threshold will cause the scheduler 450 to select rasterising task earlier than a higher rasterising threshold. The execution of rasterising tasks whenever possible addresses the goals of minimising the time taken to output the first page (as tasks are preferably sorted first by page number), outputting pages in a regular and timely fashion (as execution of rasterising tasks progresses the next page to be output), and minimising the amount of memory used (as the output of a rasterising task is usually smaller than its input). Therefore, setting the rasterising threshold as low as possible addresses these goals.

In some implementations, for example when the time taken to retrieve information from memory 190 is high, it is desirable that the rasterising threshold be larger than the interpreting threshold. However, when retrieving information from memory 190 is relatively fast, the rasterising threshold and interpreting threshold may be set to the same value. The rasterising threshold should be at least as large as the interpreting threshold.

There may be other factors to consider when setting the rasterising threshold. For example, if a large number of final fillmaps will be buffered before rendering, it is less important that final fillmaps be produced in a timely fashion, so the rasterising threshold may be set to a relatively large value. Conversely, if final fillmaps will be rendered and printed immediately following their creation by the builder module 203, the rasterising threshold may be set to a relatively low value to ensure that the next page to be output will be produced as soon as possible.

It is preferred that the interpreting threshold and rasterising threshold are set at RIP configuration time, with these factors being considered. Because the decision which task to select is based on the amount of parallelisable work at a particular moment, the scheduler 450 is able to dynamically create the most suitable schedule in accordance with the current situation, i.e. to select a task from the queue 451 for the current context of execution considering current amount of parallelisable work, the total number of threads, the amount of idle threads etc.

(Overview Process Diagram)

Figure 9:
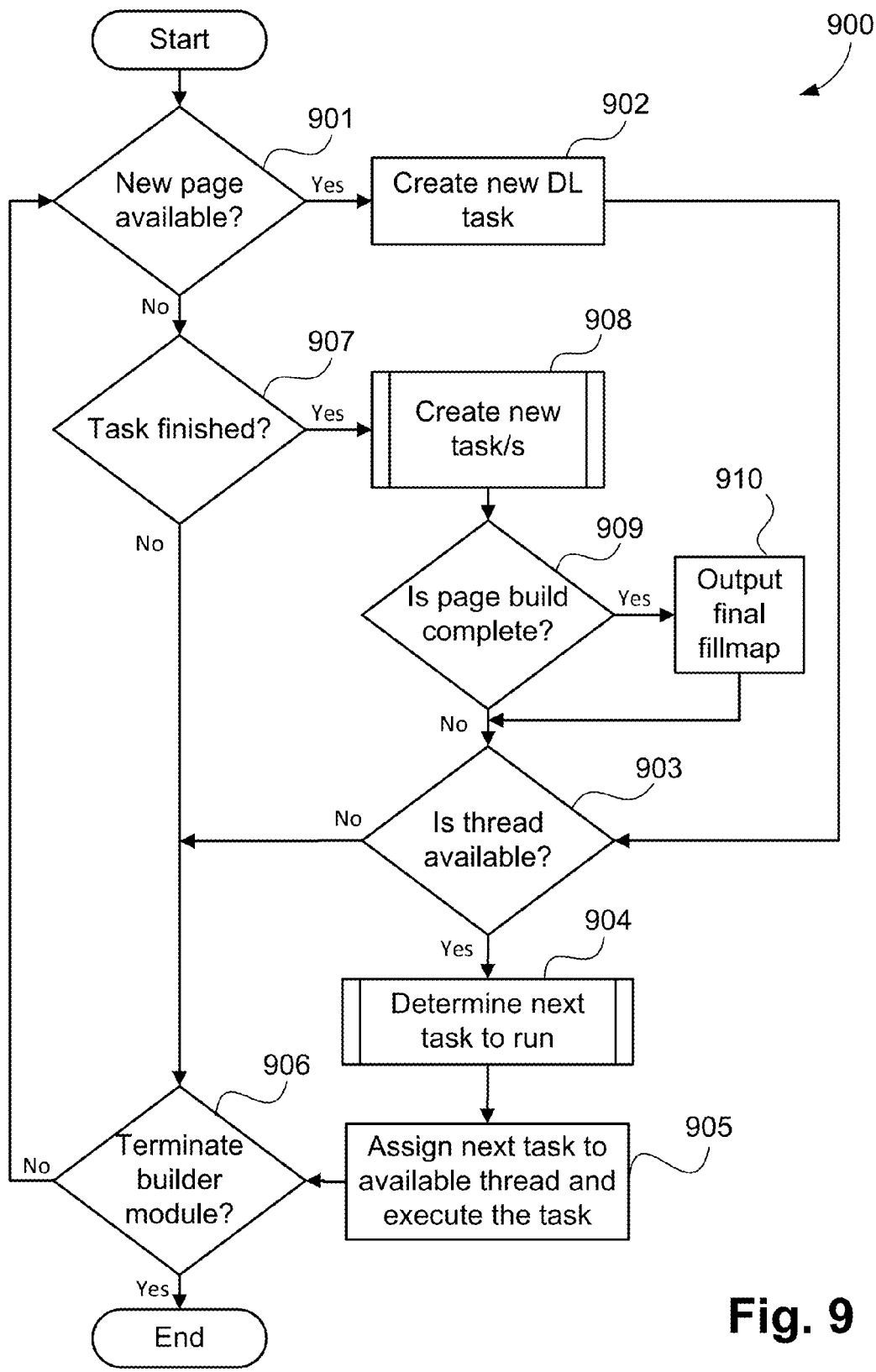
FIG. 9 is a schematic flow diagram illustrating a method of scheduling the tasks of the builder module shown in FIGS. 8A and 8B.

A preferred process 900 of scheduling tasks of the builder module 203, as executed by the scheduler 450, will now be described with reference to FIG. 9. In the preferred implementation, process 900 is expressed as software as part of the controlling program 181 and executed using a dedicated thread running on one of the controller processors 170. This thread is preferably executing in parallel with other threads of the builder module 203 that are executing tasks. Therefore, the creation of new tasks by the scheduler 450 is performed in parallel with the execution of other tasks within the builder module 203. As described earlier, the responsibility of the scheduler 450, by means of scheduling process 900, is to create new tasks, and decide when and with which builder thread to execute each task.

Process 900 starts and proceeds to decision step 901 where it is decided if a new page is available. A new page may be available if a new printable document 201 is input to the builder module 203. This may happen, for example, if the user of a software application 133 chooses to print a document. If a printable document 201 contains more than one page, process 900 selects the next page that is yet to be processed by process 900.

If it is determined that there is a new page available, process 900 proceeds to step 902 where a new DL task is created to be waiting for execution. The creation of a task involves the specification of what the task will do when it is executed (e.g. interpret the next z-band of page 1), and the storage of this information in the task queue 451. This DL task created at step 902 will, when executed, interpret the first z-band of objects from the page and generate a display list. Step 902 then adds the created DL task to the task queue 451, as the created DL task is ready to be executed. As described later with reference to FIG. 12, this created DL task is considered an interpreting task that contributes to the determined amount of parallelisable work.

Alternatively, rather than creating a new DL task at step 902, information can be recorded in memory 190 associated with the scheduler 450 that identifies the page that has become available. Then, when it is determined that an interpreting task should be executed, a DL task can be created (using the recorded page information) and executed immediately without first storing it in the task queue 451. In such an implementation, the task queue 451 will not contain DL tasks associated with new pages. This implementation may be appropriate for the printing of a first page of a multi-page print job.

Process 900 then proceeds to decision step 903, where it is determined if there is an idle thread available to execute a task from the task queue 451. If it is determined that there is a thread available, process 900 proceeds to step 904 where the next task to run on an available thread is determined. The process 904 of determining the next task to run will be described later with reference to FIG. 11. Process 900 then proceeds to step 905, where the next task to run, determined at step 904, is assigned to an available thread. Assigning a task to an available thread triggers the execution of the task using one of the controller processors 170. The next task to run is also removed from the task queue 451. Process 900 then proceeds to decision step 906, where it is determined if the builder module 203 should terminate. The builder module 203 should terminate, for example, if the printing system 115 has been switched off. If it is determined that the builder module 203 should not terminate, process 900 returns to decision step 901.

If it is determined at decision step 901 that there are no new pages available, process 900 proceeds to step 907, where it is determined if a task assigned to a thread has finished executing. If it is determined that a task has finished executing, process 900 proceeds to step 908, where new task/s are created. New tasks are added to the task queue 451. Process 908 will be described in more detail later with reference to FIG. 10.

Upon completion of step 908, process 900 proceeds to step 909, where it is determined if the building process for a page is complete. The building process for a page is complete if all the tasks for the page are complete, all objects have been interpreted, and the final fillmap is produced. If it is determined that a page build is complete, process 900 proceeds to step 910, where the final fillmap for the completed page is output to the renderer module 205. Process 900 then proceeds to decision step 903. If it is determined at step 909 that the building of a page is not complete, processing proceeds to step 903.

If it is determined at decision step 903 that there are no threads available, process 900 proceeds to step 906. If it is determined at step 907 that no tasks have finished execution, process 900 proceeds to step 906.

If it is determined at step 906 that the builder module should terminate, process 900 ends.

(Create New Task/s Process Diagram)

Figure 10:
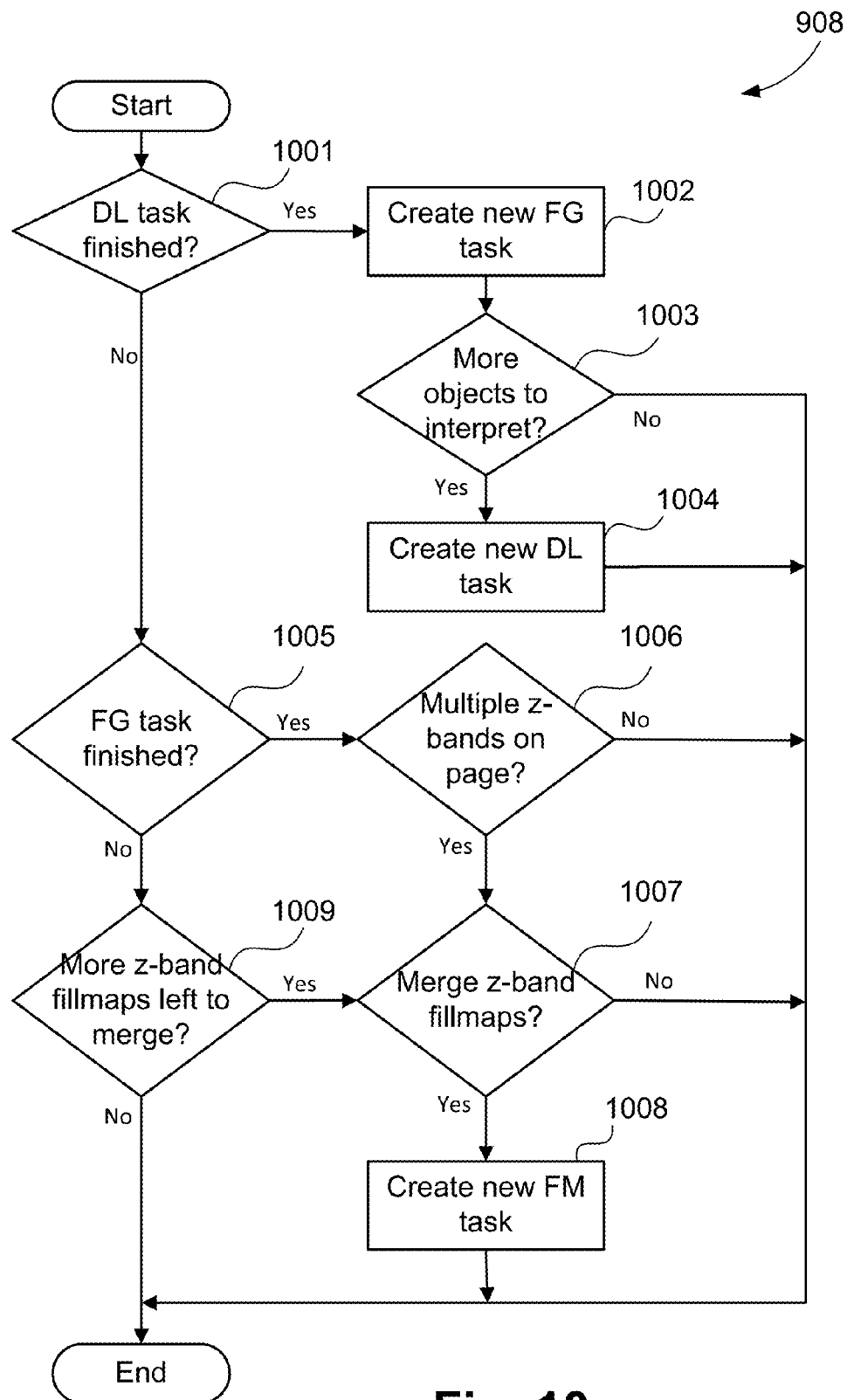
FIG. 10 is a schematic flow diagram illustrating a method of creating new tasks as used in the method of FIG. 9.

The process 908 of creating new task/s in response to a task finishing will now be described with reference to FIG. 10. Process 908 starts and proceeds to decision step 1001, where it is determined if the task that finished (as determined at step 907 of process 900) is a DL task. If it is determined that the task that finished is a DL task, process 908 proceeds to step 1002, where a new FG task is created. This new FG task will generate a fillmap using the display list produced by the finished DL task. The new FG task is also added to the task queue 451 at step 1002.

Process 908 then proceeds to decision step 1003, where it is determined if there are more objects on the current page that have not yet been interpreted. The splitting of a page of objects into z-bands was described previously with reference to FIGS. 6A and 6B. The display list for each z-band is generated by a separate DL task. Therefore, if the finished DL task did not generate the display list for the final z-band of objects, more DL tasks are required for the page. If it is determined at step 1003 that there are more objects on the page to interpret, processing proceeds to step 1004 where a new DL task is created. The new DL task will interpret the next z-band of objects on the page and generate a display list. The new DL task is also added to the task queue 451 at step 1004. Note that in this preferred implementation, DL tasks are only created when a new page is available (at step 902) and when a previous DL task is finished and more objects remain for the current page (at step 1004). Therefore, any DL task that exists in the task queue 451 is available for execution. That is, the DL task's dependencies, being previous DL tasks for the page, have been satisfied. All DL tasks for a page cannot be created prior to interpreting the page because it is generally not known how many graphic objects exist, and how many z-bands will be required. DL tasks are created only as needed. The expected number of interpreting tasks as determined by the present arrangements can therefore only be estimated. In some implementations, the expected number of interpreting tasks is estimated based on the complexity of the pages to be rasterised as generally determined by the number of graphic objects on each page.

Alternatively, rather than creating a new DL task at step 1004, information can be recorded in memory 190 associated with the scheduler 450 that identifies the page that is currently being interpreted, and the point in the PDL at which interpreting should re-commence when the page's next DL task is executed. Then, when it is determined that an interpreting task should be executed using this thread associated with the finished task, a DL task can be created (using the recorded page and PDL interpreting information) and executed immediately without first storing it in the task queue 451. In such an implementation, the task queue 451 will not contain DL tasks associated with pages being interpreted.

Process 908 ends upon completion of step 1004. If it is determined at step 1003 that there are no more objects on the page to interpret, process 908 ends.

If it is determined at decision step 1001 that the task that finished is not a DL task, process 908 proceeds to decision step 1005 where it is determined if the task that finished is an FG task. If it is determined that the finished task is an FG task, processing proceeds to step 1006, where it is determined if the page to which the FG task belongs contains multiple z-bands. Pages with few objects will typically only contain one z-band, while pages with many objects will typically contain multiple z-bands. If a page contains multiple z-bands, the fillmaps produced by each z-band's FG task will need to be merged by one or more FM tasks.

If it is determined at step 1006 that there are multiple z-bands on the page, processing proceeds to decision step 1007 where it is determined if multiple z-band fillmaps should now be merged. This decision may be based on several factors, including the number of z-band fillmaps 432 with consecutive z-orders that have previously been generated for the page, the amount of memory available, and whether there are DL tasks for the page that are yet to finish. If all DL tasks for the page are complete, merging must take place in order to progress the processing of the page towards a final fillmap. If it is decided at step 1007 that z-band fillmaps should be merged, process 908 proceeds to step 1008 where a new FM task is created to merge a sequence of z-band fillmaps with consecutive z-orders. The new FM task is also added to the task queue 451 at step 1008. Process 908 ends upon completion of step 1008.

If it is determined at step 1006 that there are not multiple z-bands on the page, process 908 ends. If it is determined at step 1007 z-band fillmaps for the page should not be merged, process 908 ends.

If it is determined at step 1005 that the finished task is not an FG task, processing proceeds to step 1009. If step 1009 is reached, the finished task is an FM task. At step 1009 it is determined if there are more z-bands on the page remaining to be merged. In some cases, the finished FM task will have merged only a subset of the z-band fillmaps for the page, in which case more merging take place to produce the final fillmap. Conversely, the finished FM task may have merged all remaining z-band fillmaps, producing the final fillmap. If it is determined at step 1009 that there are more z-band fillmaps left to merge, processing proceeds to step 1007. If it is determined that there are no more z-band fillmaps left to merge, process 908 ends.

(Determine Next Task to Run)

Figure 11:
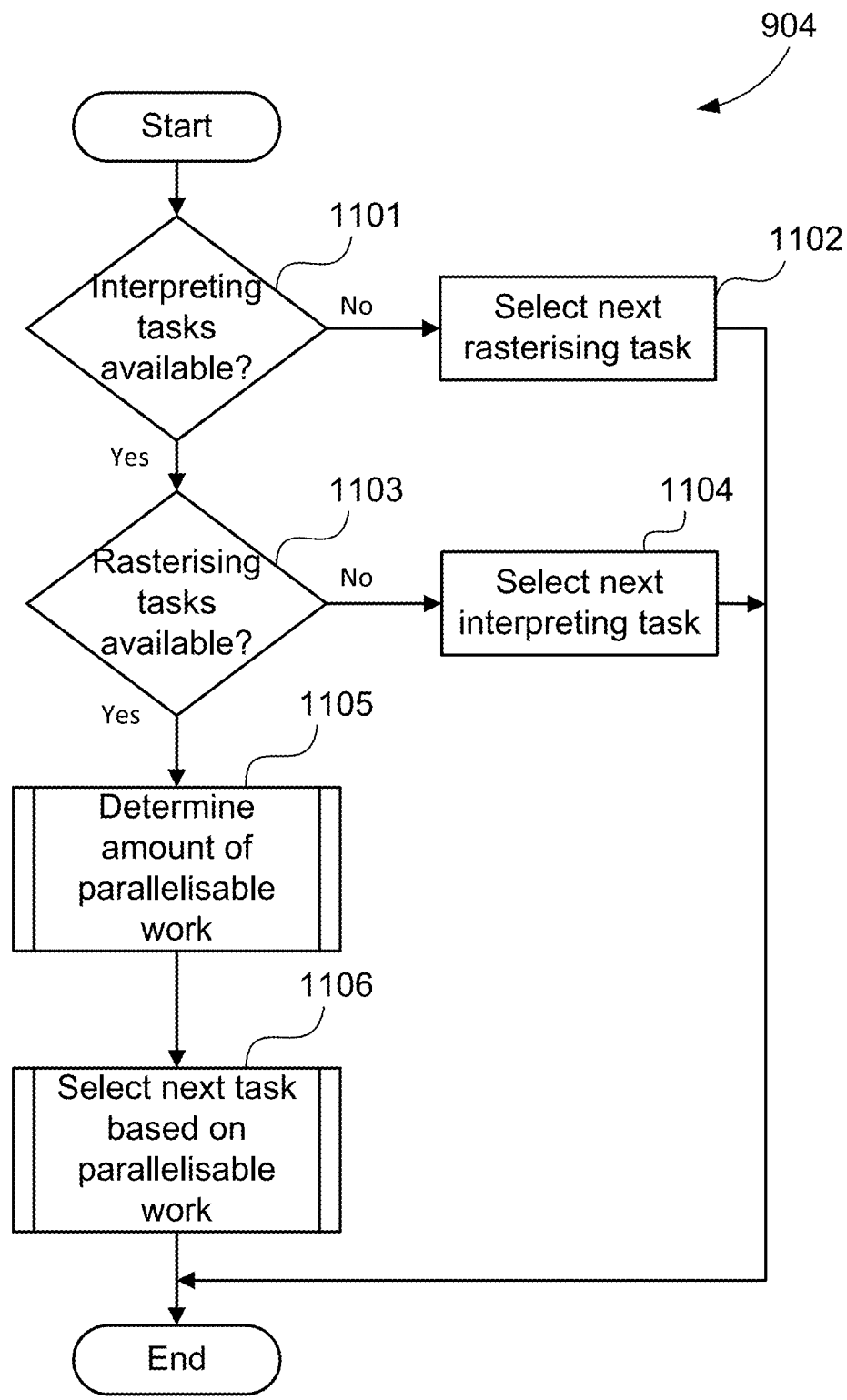
FIG. 11 is a schematic flow diagram illustrating a method of determining the next task to run as used in the method of FIG. 9.

The process 904 of determining the next task to run will now be described with reference to FIG. 11. Process 904 starts and proceeds to decision step 1101 where it is determined if there are interpreting tasks available in the task queue 451. As described earlier with reference to FIG. 4, in the present implementation, DL tasks are interpreting tasks. If it is determined at step 1101 that there are no interpreting tasks available, process 904 proceeds to selection step 1102 where the next rasterising task is selected from the task queue 451. Preferably, the first task in the task queue 451 is selected. As there are no interpreting tasks available, only rasterising tasks can be selected. Upon completion of step 1102, process 904 ends.

If it is determined at step 1101 that there are interpreting tasks available, processing proceeds to decision step 1103 where it is determined if there are rasterising tasks available in the task queue 451. As described earlier with reference to FIG. 4, in the present implementation, FG tasks and FM tasks are rasterising tasks. If it is determined at step 1103 that there are no rasterising tasks available, process 904 proceeds to selection step 1104 where the next interpreting task is selected. As there are no rasterising tasks available, only interpreting tasks can be selected. If the idle thread does not have a page that it is currently interpreting (there are no DL tasks in the task queue 451 for its most recently interpreted page), it is free to select the next page for which interpreting has not yet begun, and create a new interpreting task. However, if the idle thread does have a page that it is currently interpreting (a DL task exists in the task queue 451 for its most recently interpreted page), the interpreting task for this page must be selected. An interpreting task for a page that is currently being processed by another thread must not be selected, as pages can only be interpreted by a single thread. Upon completion of step 1104, process 904 ends.

Figure 12:
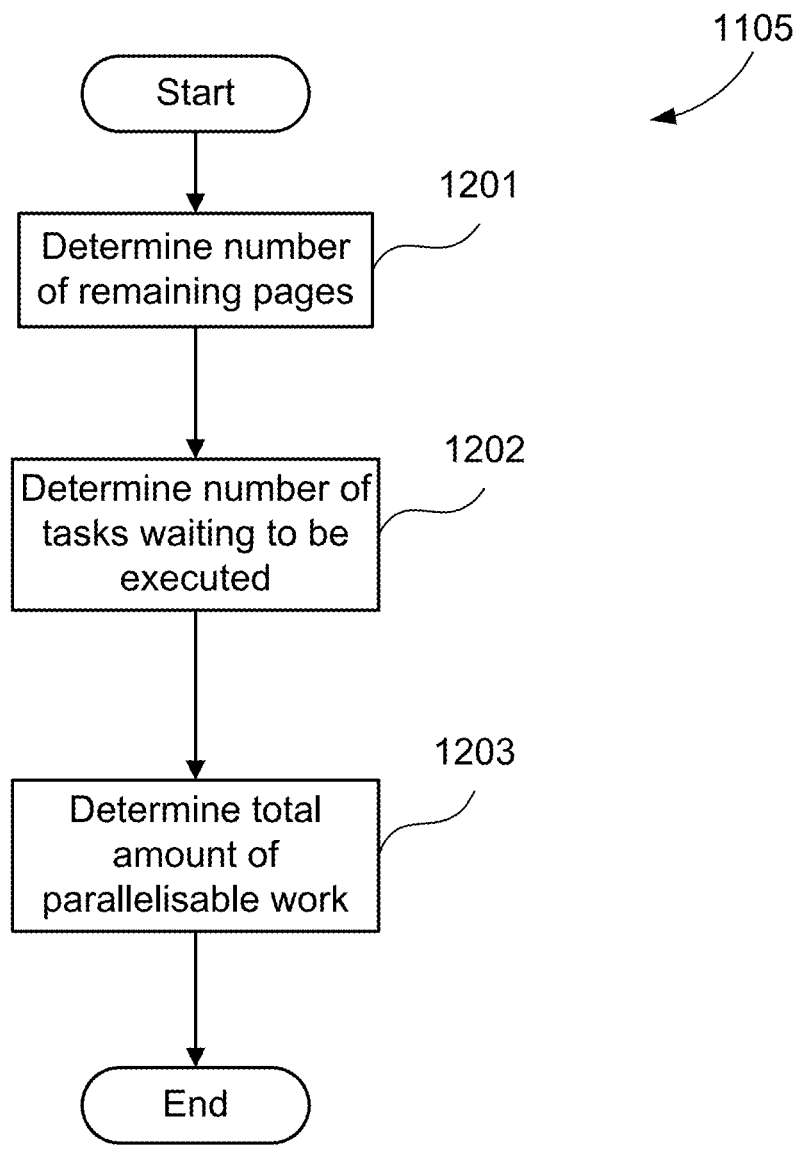
FIG. 12 is a schematic flow diagram illustrating a method of determining the amount of parallelisable work as used in the method of FIG. 11.

If it is determined at step 1103 that there are rasterising tasks available, processing proceeds to determining step 1105, where the amount of parallelisable work is determined Step 1105 will be described in more detail later with reference to FIG. 12. Processing then proceeds to selection step 1106, where the next task is selected based on the determined amount of parallelisable work. Step 1106 will be described in more detail later with reference to FIG. 13. Upon completion of step 1106, process 904 ends.

(Determine Amount of Parallelisable Work)

The process 1105 of determining the amount of parallelisable work will now be described with reference to FIG. 12. As described earlier with reference to FIG. 4, the amount of parallelisable work represents the scheduler's ability to utilise the threads in the event that the threads become idle.

Process 1105 starts and proceeds to step 1201 where the number of remaining pages that have not yet started to be interpreted is determined. The number of remaining pages represents the parallelisable work available to be executed in the form of interpreting tasks (in addition to the DL tasks in the task queue 451). The number of remaining pages is an indication of the expected number of interpreting tasks, in addition to the number of DL tasks in the task queue 451 which is known. In the preferred implementation, pages can be interpreted in parallel on separate threads. Therefore, the larger the number of remaining pages, the more threads that can be utilised in the event that the threads become idle. An example of determining the number of remaining pages will be described later with reference to FIG. 14A to 15B.

Process 1105 then proceeds to step 1202, where the number of tasks waiting to be executed is determined. This is performed by summing the number of tasks in the task queue 451. The number of waiting tasks represents the parallelisable work available to be executed in the form of interpreting and rasterising tasks, as all tasks in the task queue 451 have their dependencies satisfied and are therefore ready to be executed in parallel with each other and other executing tasks. In the current description, for simplicity, an FG task corresponding to a particular display list is referred to as a single task. However, practically each DL task provides an input for a plurality of rasterising tasks, so that by executing a DL task an amount of parallelisable work is increased. Therefore, in some implementations, in order to determine the amount of parallelisable work, each FG task can be split into a plurality of parallelisable FG tasks, e.g. y-bands or strips. For example, each FG task can be analysed to determine the number of y-bands (strips) the task can be split into in order to execute each y-band (strip) in parallel. Task in the created plurality of FG tasks are considered when calculating the amount of parallelisable work. In the preferred implementation, all waiting tasks can be executed in parallel on separate threads. Therefore, the larger the number of waiting tasks, the more threads that can be utilised in the event that they the threads idle. An example of determining the number of tasks waiting to be executed will be described later with reference to FIGS. 14A to 15B.

Process 1105 then proceeds to step 1203, where the total amount of parallelisable work is determined. This is preferably performed by summing the number of remaining pages determined at step 1201 with the number of tasks waiting to be executed, determined at step 1202. In other implementations, the number of remaining pages and the number of interpreting and rasterising tasks waiting to be executed are first multiplied by a weighting factor before being summed to form the total amount of parallelisable work. The weighting factor can be, for example, based on the estimated relative processing times of interpreting and rasterising tasks. For example, if it is known though past execution that rasterising tasks typically take twice as long to execute than interpreting tasks, the number of rasterising tasks waiting to be executed may be multiplied by a weighting factor of 2, while the number of interpreting tasks waiting to be executed and the number of remaining pages may be multiplied by a weighting factor of 1. The resulting number represents the total amount of parallelisable work that can be executed (potentially in parallel) in the event that one or more threads become idle. Upon completion of step 1203, process 1105 ends.

(Select Next Task Based on Parallelisable Work)

Figure 13:
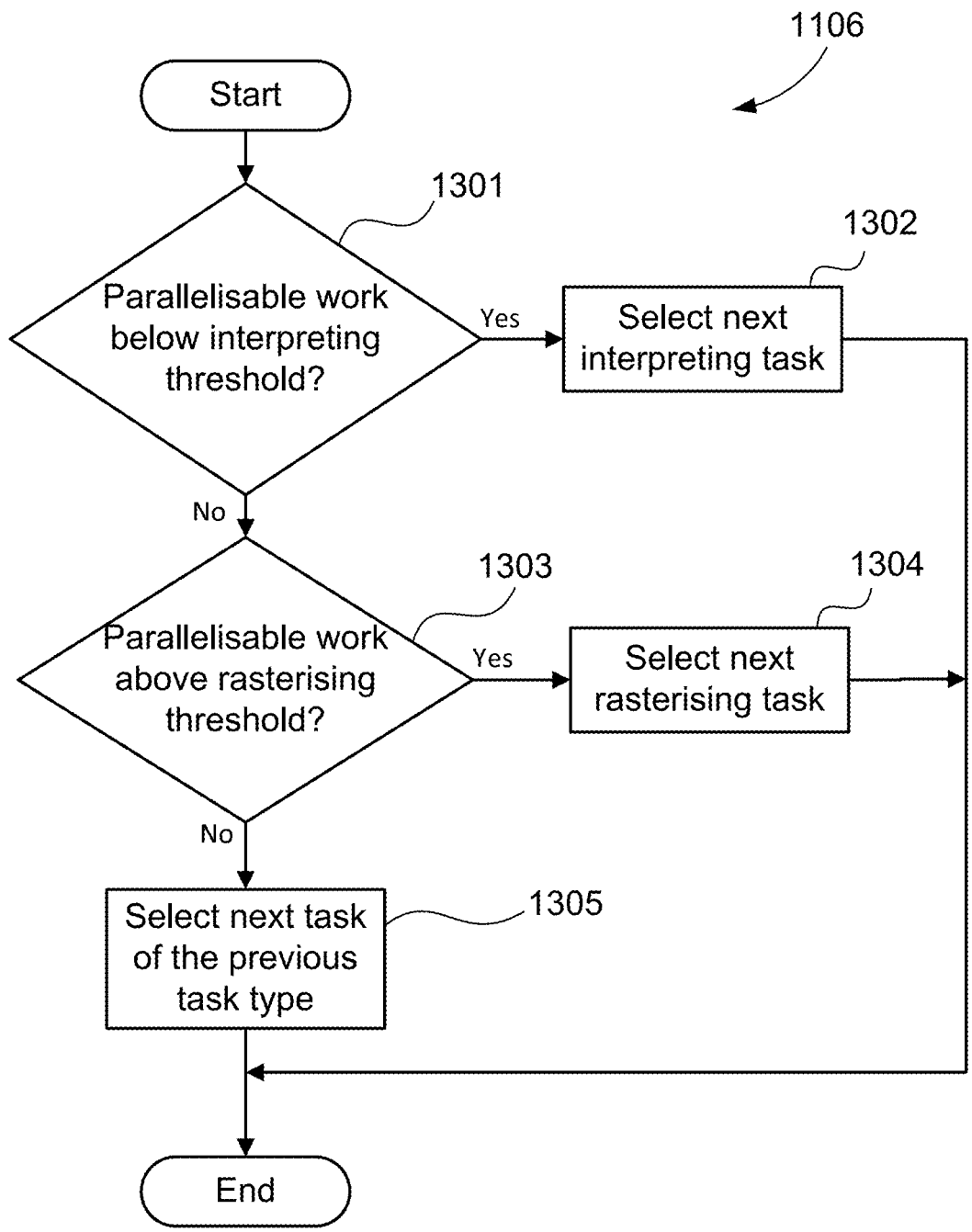
FIG. 13 is a schematic flow diagram illustrating a method of selecting the next task based on the amount of parallelisable work as used in the method of FIG. 11.

The process 1106 of selecting the next task based on the amount of parallelisable work will now be described with reference to FIG. 13. As described earlier, executing interpreting tasks serves to increase the amount of parallelisable work, addressing the goals of keeping threads well-utilised and minimising the time taken to process all pages being printed. Conversely, executing rasterising tasks reduces the amount of parallelisable work, but addresses the goals of outputting the first and subsequent pages in a regular and timely fashion, and minimising the amount of memory used by the builder module 203. The scheduler 450 attempts to maintain a sufficient amount of parallelisable work to keep threads busy should they become idle, while maintaining a constant flow of pages through the builder module 203.

Process 1106 starts and proceeds to decision step 1301 where it is determined if the amount of parallelisable work is below an interpreting threshold. If the observed amount of parallelisable work is below the interpreting threshold, the amount of parallelisable work is considered to be too low and the scheduler 450 can favour execution of interpreting tasks. The change of the amount of parallelisable work to go below the interpreting threshold is evidence of a decreasing amount of parallelisable work. In this case, the objective of the scheduler 450 is to improve the amount of parallelisable work so that the threads can be utilised in the event that they become idle.

If it is determined at step 1301 that the amount of parallelisable work is below the interpreting threshold, process 1106 proceeds to step 1302 where the next interpreting task is selected. The selection of an interpreting task will gather more objects into the builder module 203, eventually producing more rasterising tasks and therefore increasing the amount of parallelisable work. In some implementations, the selected next interpreting task corresponds to the next z-band of objects for the page currently being processed by the idle thread or, if the thread is not currently processing a specific page, the first interpreting task for the next page that is yet to be interpreted. Alternatively, the selected next interpreting task is the interpreting task that will produce the largest amount of parallelisable work. For example, if the complexity of the PDL pages has been determined, it may be known that some interpreting tasks contain objects that span multiple y-bands and therefore will produce a large amount of parallelisable work (in the form of rasterising tasks, such as FG and FM, that would be produced by the interpreting task) An example of selecting an interpreting task upon determining that the amount of parallelisable work is below the interpreting threshold will be described later with reference to FIGS. 15A and 15B. Upon completion of step 1302, process 1106 ends.

If it is determined at step 1301 that the amount of parallelisable work is not below the interpreting threshold, process 1106 proceeds to decision step 1303 where it is determined if the amount of parallelisable work is above a rasterising threshold. If it is observed that amount of parallelisable work is above the rasterising threshold, the amount of parallelisable work is considered to be sufficiently high, and so the scheduler 450 will favour the execution of rasterising tasks. The change of the amount of parallelisable work to go above the rasterising threshold is evidence of an increasing amount of parallelisable work. In this case, the objective of the scheduler 450 is to progress the next fillmap 205 to be output as quickly as possible, so as to improve the rate at which pages are processed. As a consequence of this objective, the memory used by the builder module 203 will also be reduced. As the amount of parallelisable work is sufficiently high, there is enough work available to utilise all threads in the event they become idle.

If it is determined at step 1303 that the amount of parallelisable work is above the rasterising threshold, process 1106 proceeds to step 1304 where the next rasterising task is selected. As described earlier with reference to FIG. 4, the rasterising tasks stored in the task queue 451 are preferably sorted first by page number, then by z-order. Therefore, the first rasterising task selected from the task queue 451 will belong to the next page to be output. Executing this task will cause the next page to progress further towards a final fillmap 204. Alternatively, a particular rasterising task may be selected if it belongs to the next page and it is known that by executing the task the amount of parallelisable work will increase. For example, a particular FG (rasterising) task may complete a z-band fillmap for a group of consecutive z-band fillmaps, thereby enabling several fillmap merge (rasterising) tasks to be executed in parallel. An example of selecting a rasterising task upon determining that the amount of parallelisable work is above the rasterising threshold will be described later with reference to FIGS. 14A and 14B. Upon completion of step 1304, process 1106 ends.

If it is determined at step 1303 that the amount of parallelisable work is not above the rasterising threshold, process 1106 proceeds to step 1305, where the next task is selected to match the type of the task that was previously selected for the available thread. If the previous task was an interpreting task, an interpreting task is selected. If the previous task was a rasterising task, a rasterising task is selected. In this case, the scheduler 450 has no strong objective. A task of the same type as the previous task is selected so that tasks can run as efficiently as possible. For example, if the previous task was an interpreting task, it may be advantageous to select another interpreting task so that any state information stored in the cache structures of the controller processors 170 can be fully utilised. Upon completion of step 1305, process 1106 ends.

In the implementation described previously with reference to FIG. 13, the scheduler 450 selects the next task to run based on two thresholds: the interpreting threshold and the rasterising threshold. In another implementation, a single threshold may be used to select the next task to run. When using a single threshold, an interpreting task may be selected if the amount of parallelisable work is below the threshold. If the amount of parallelisable work is above the threshold, a rasterising task may be selected. The use of a single threshold means the advantages of step 1305 will not be attained, but it simplifies the scheduling process, potentially making it faster to execute. The main goals of the builder module 203 are still achieved with the use of a single threshold.

Example(s)/User Case(s)

Above Rasterising Threshold

An example of determining the amount of parallelisable work and selecting a rasterising task in response to the amount of parallelisable work being above the rasterising threshold will now be described with reference to FIGS. 14A and 14B. This description also references the example of the execution of the tasks described previously with reference to FIGS. 8A and 8B. In this example, the interpreting threshold 1420 is set to 4, and the rasterising threshold 1421 is set to 6.

Figure 14A:
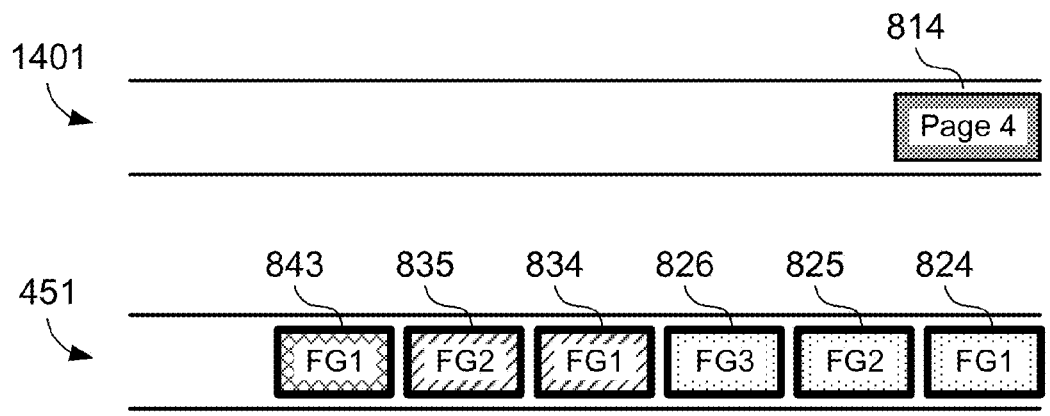
FIGS. 14A and 14B show an example of determining the amount of parallelisable work and selecting a rasterising task in response to the amount of parallelisable work being above the rasterising threshold.
Figure 14B:
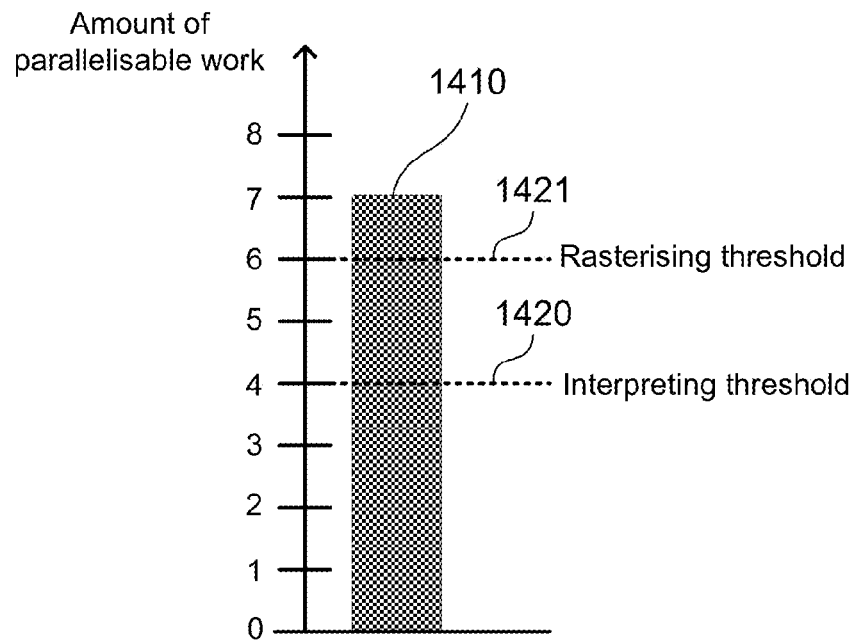

FIG. 14A shows the contents of the task queue 451 and the list of remaining pages 1401 at the time $t_1$ 861, which is shown in FIG. 8. This is the time that thread 1 801 has finished processing DL task DL3 823, and the next task to run on thread 1 801 is being determined by step 904, described previously with reference to FIG. 9. At time $t_1$ 861, interpreting tasks for pages 1 811, 2 812 and 3 813 have begun. Therefore, only page 4 814 remains in the list of remaining pages 1401, as seen in FIG. 14A. Therefore, the number of remaining pages determined at step 1201 of process 1105, described previously with reference to FIG. 12, is equal to 1.

Also at time $t_1$ 861, a number of FG tasks have been created and are stored in the task queue 451. These are FG tasks 824-826 for page 1 811, FG tasks 834-835 for page 2 812, and FG task 843 for page 3 813. These FG tasks are considered to be rasterising tasks. Since DL tasks 833 and 842 are not yet complete, their corresponding FG tasks do not yet exist. Based on the contents of the task queue 451 at time $t_1$ 861, the number of tasks waiting to be executed as determined at step 1202 of process 1105 is equal to 6.

Therefore, at time $t_1$ 861, the total amount of parallelisable work 1410 determined at step 1203 of process 1105 is equal to the sum of 1 and 6, which is 7. When this amount of parallelisable work 1410 is compared with the interpreting threshold 1420 and the rasterising threshold 1421 as seen in FIG. 14B, as performed by steps 1301 and 1303, respectively, it is determined that the amount of parallelisable work 1410 is above the rasterising threshold 1421. Therefore, the next rasterising task is selected for execution on the idle thread, thread 1 801, as performed by step 1304 of process 1106.

In the preferred implementation, tasks in the task queue 451 are ordered first by page number, then z-band number. Therefore, the next rasterising task selected for execution is FG task FG1 824, belonging to page 1 811. In FIG. 8A, this task 824 is shown to be executing immediately after time $t_1$ 861 on thread 1 801.

(Below Interpreting Threshold)

An example of determining the amount of parallelisable work and selecting an interpreting task in response to the amount of parallelisable work being below the interpreting threshold will now be described with reference to FIGS. 15A and 15B. This description also references the example of the execution of the tasks described previously with reference to FIGS. 8A and 8B. In this example, the interpreting threshold 1420 is set to 4, and the rasterising threshold 1421 is set to 6.

Figure 15A:
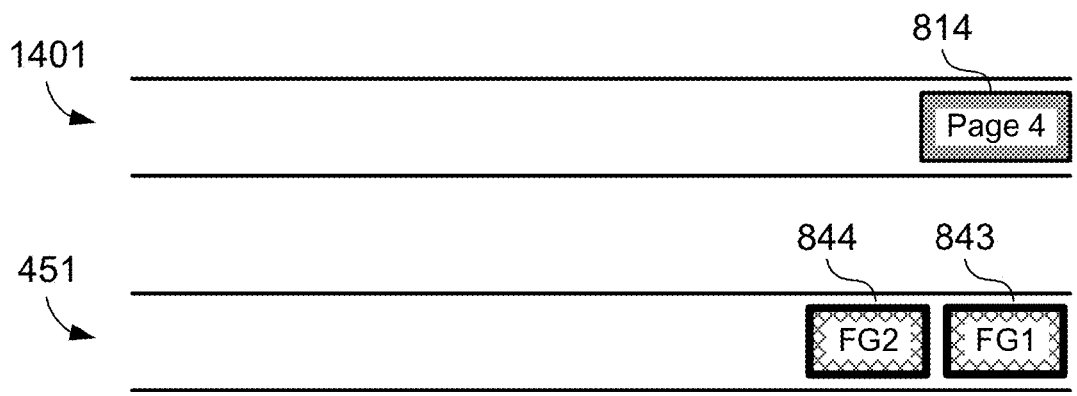
FIGS. 15A and 15B show an example of determining the amount of parallelisable work and selecting a rasterising task in response to the amount of parallelisable work being below the interpreting threshold.
Figure 15B:
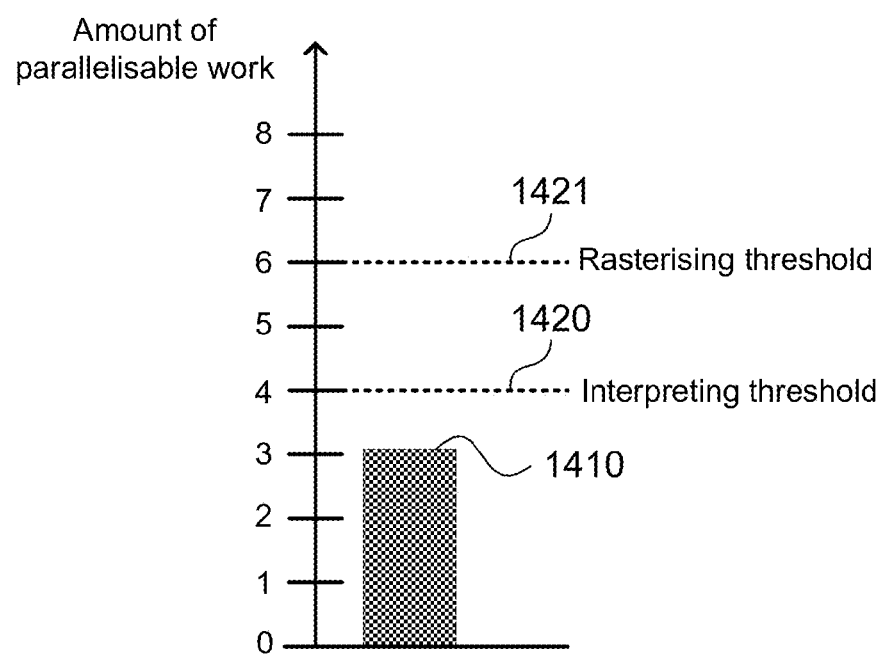

FIG. 15A shows the contents of the task queue 451 and the list of remaining pages 1401 at the time $t_2$ 862, which is shown in FIG. 8A. This is the time that thread 1 801 has finished processing FG task FG3 836, and the next task to run on thread 1 801 is being determined by step 904, described previously with reference to FIG. 9. At time $t_2$ 862, interpreting tasks for pages 1 811, 2 812 and 3 813 have completed. Therefore, only page 4 814 remains in the list of remaining pages 1401. Therefore, the number of remaining pages determined at step 1201 of process 1105, described previously with reference to FIG. 12, is equal to 1.

Also at time $t_2$ 862, a number of FG tasks belonging to pages 1-3 811-813 have been created and have completed, some are currently executing, and some have been created and are stored in the task queue 451. These tasks stored in the task queue 451 are FG tasks 843 and 844 for page 3 813. These FG tasks are considered to be rasterising tasks. Based on the contents of the task queue 451 at time $t_2$ 862, the number of tasks waiting to be executed as determined at step 1202 of process 1105 is equal to 2.

Therefore, at time $t_2$ 862, the total amount of parallelisable work 1410 determined at step 1203 of process 1105 is equal to the sum of 1 and 2, which is 3. As seen in FIG. 15B, when this amount of parallelisable work 1410 is compared with the interpreting threshold 1420 and the rasterising threshold 1421, as performed by steps 1301 and 1303, respectively, it is determined that the amount of parallelisable work 1410 is below the interpreting threshold 1420. Therefore, the next interpreting task is selected for execution on the idle thread, thread 1 801, as performed by step 1304 of process 1106.

The selected next interpreting task will be the first DL task 851 belonging to page 4 814, as all interpreting tasks for previous pages are complete. In FIG. 8A, this task 851 is shown to be executing immediately after time $t_2$ 862 on thread 1 801.

INDUSTRIAL APPLICABILITY

The arrangements described are applicable to the computer and data processing industries and particularly for the parallelised rendering of images and documents for printing.

The foregoing describes only some embodiments of the present invention, and modifications and/or changes can be made thereto without departing from the scope and spirit of the invention, the embodiments being illustrative and not restrictive.

I claim:

1. A method of rasterising a document using a plurality of threads, the method comprising:
   interpreting objects of the document by performing interpreting tasks;
   establishing a plurality of rasterising tasks associated with the performed interpreting tasks, each performed interpreting task establishing a plurality of rasterising tasks;
   estimating an amount of parallelisable work available to be performed using the plurality of threads, the amount of parallelisable work being estimated using the established plurality of rasterising tasks and an expected number of interpreting tasks to be performed, wherein the parallelizable work comprises one or more of the rasterizing tasks from the established plurality of rasterizing tasks together with one or more of the interpreting tasks to be performed;
   selecting, based on the estimated amount of parallelisable work, one of:
      (i) an interpreting task to interpret objects of the document, and
      (ii) a rasterising task from the established plurality of rasterising tasks; and
   executing the selected task using at least one thread to rasterize the document.

2. A method according to claim 1, comprising selecting and executing the interpreting tasks to increase the amount of parallelisable work.

3. A method according to claim 1, wherein the selecting further comprises determining the relative need for (i) increasing the amount of parallelisable work available, and (ii) outputting the next page.

4. A method according to claim 1, wherein the estimated number of interpreting tasks is based on a number of pages remaining to be processed for the document and objects of the document yet to be interpreted.

5. A method according to claim 1, where the expected number of interpreting tasks is determined based on complexity of the pages.

6. A method according to claim 1, comprising favouring the execution of interpreting tasks upon observing a decreasing amount of parallelisable work.

7. A method according to claim 1, comprising favouring the execution of rasterising tasks upon observing an increasing amount of parallelisable work.

8. A method according to claim 1, wherein the expected number of interpreting tasks being based on the number of pages left in the document.

9. A method according to claim 1, wherein estimating the amount of parallelisable work further comprises applying a weighting factor to the rasterising tasks and expected interpreting tasks to be performed, wherein different weighting factors are given to interpreting and rasterising tasks based on the estimated relative processing time of interpreting and rasterising tasks.

10. A method according to claim 1, wherein the selecting is based on a plurality of thresholds which are dependent on the number of threads and the number of interpreting threads.

11. A method according to claim 10, wherein if the amount of parallelisable work is below a first threshold, an interpreting task is selected, and where the amount of parallelisable work is above a second threshold, a rasterising task is selected.

12. A method according to claim 11, wherein the first and second thresholds are different with the second threshold being no less that the first threshold.

13. A method according to claim 8, further comprising estimating the complexity of pages left in the document from a PDL source using at least one of the number of pages described by the PDL source, a number of objects on a page, and/or a number of z-bands of a page.

14. A method according to claim 8, further comprising estimating complexity of a current page by considering a complexity of at least one immediately preceding page.

15. A non-transitory computer readable storage medium having a program recorded thereon, the program being executable by a processor to rasterise a document using a plurality of threads associated with the processor, the program comprising:
   code for interpreting objects of the document by performing interpreting tasks associated with said objects, wherein objects associated with different pages are interpreted in parallel;
   code for establishing a plurality of rasterising tasks associated with the performed interpreting tasks, each performed interpreting task establishing a plurality of rasterising tasks;
   code for estimating an amount of parallelisable work available to be performed using the plurality of threads, the amount of parallelisable work being estimated using the established plurality of rasterising tasks and an expected number of interpreting tasks to be performed, wherein the parallelizable work comprises one or more of the rasterizing tasks from the established plurality of rasterizing tasks together with one or more of the interpreting tasks to be performed;
   code for selecting, based on the estimated amount of parallelisable work, one of:
      (i) an interpreting task to interpret objects of the document, and
      (ii) a rasterising task from the established plurality of rasterising tasks; and
   code for executing the selected task using at least one thread to rasterize the document.

16. A method of rasterising a document using a plurality of threads, the method comprising:
   interpreting objects of the document by performing interpreting tasks;
   establishing a plurality of rasterising tasks associated with the performed interpreting tasks such that at least one rasterising task is established for each performed interpreting task;
   estimating an amount of parallelisable work available to be performed using the plurality of threads, the parallelisable work comprising rasterizing tasks from the established plurality of rasterising tasks and interpreting tasks;
   determining a preference for executing a rasterising task from the established plurality of rasterising tasks over executing an interpreting task to interpret objects of the document based on the estimated amount of parallelisable work;

selecting, based on the determined preference, one of:
- (i) an interpreting task to interpret objects of the document, and
- (ii) a rasterising task from the established plurality of rasterising tasks; and executing the selected task using at least one thread to rasterize the document.

\* \* \* \* \*